(12) United States Patent
Morozumi et al.

(10) Patent No.: US 7,933,069 B2
(45) Date of Patent: Apr. 26, 2011

(54) DISPLAY DEVICE, DISPLAY CONTROLLING METHOD, AND PROGRAM

(75) Inventors: Takeshi Morozumi, Miyagi (JP);
Kenichi Takahashi, Kanagawa (JP);
Hiroki Naito, Kanagawa (JP)

(73) Assignee: Sony Corporation, Tokyo (JP)

( * ) Notice: Subject to any disclaimer, the term of this patent is extended or adjusted under 35 U.S.C. 154(b) by 285 days.

(21) Appl. No.: 11/913,296

(22) PCT Filed: Jul. 11, 2006

(86) PCT No.: PCT/JP2006/313748
§ 371 (c)(1),
(2), (4) Date: Dec. 19, 2007

(87) PCT Pub. No.: WO2007/010782
PCT Pub. Date: Jan. 25, 2007

(65) Prior Publication Data
US 2009/0015918 A1    Jan. 15, 2009

(30) Foreign Application Priority Data

Jul. 21, 2005    (JP) ................................. 2005-211755

(51) Int. Cl.
*G02B 27/22* (2006.01)
(52) U.S. Cl. .......................................... 359/463; 348/59
(58) Field of Classification Search .......................... None
See application file for complete search history.

(56) References Cited

U.S. PATENT DOCUMENTS

| | | | |
|---|---|---|---|
| 5,493,427 A | 2/1996 | Nomura et al. | |
| 5,659,330 A | 8/1997 | Sheridon | |
| 6,014,259 A | 1/2000 | Wohlstadter | |
| 6,160,527 A * | 12/2000 | Morishima et al. | 345/7 |
| 6,369,954 B1 * | 4/2002 | Berge et al. | 359/666 |
| 6,806,851 B2 | 10/2004 | Shimoyama et al. | |
| 7,307,672 B2 | 12/2007 | Feenstra et al. | |
| 7,532,272 B2 | 5/2009 | Woodgate et al. | |
| 2003/0063186 A1 | 4/2003 | Tomono | |

(Continued)

FOREIGN PATENT DOCUMENTS

GB        2398130        11/2004

(Continued)

OTHER PUBLICATIONS

European Search Report dated Nov. 10, 2009, for corresponding European Patent Application No. 06780969.9.

(Continued)

*Primary Examiner* — Lee Fineman
(74) *Attorney, Agent, or Firm* — K&L Gates LLP

(57) ABSTRACT

A display device which is capable of generating more parallaxes without reducing resolution and an image quality, a display controlling method, and a program are provided. An aperture ratio of a light source is set as 1/N, and liquid lenses are disposed at distances of focal lengths of the first liquid lens and the second liquid lens from the light source, respectively. A position controlling portion changes a position of a nonpolar liquid by a size of each of luminescent pixels as represented by the first liquid lens and the second liquid lens, which results in that emitted lights from respective luminescent pixels pass through either the first liquid lens or the second liquid lens to be emitted in directions different from one another as shown in the form of lights. The present embodiments can be applied to a parallax image displaying device.

13 Claims, 25 Drawing Sheets

U.S. PATENT DOCUMENTS

| | | | |
|---|---|---|---|
| 2003/0085850 A1* | 5/2003 | Feenstra et al. | 345/32 |
| 2004/0141237 A1 | 7/2004 | Wohlstadter | |
| 2005/0253779 A1* | 11/2005 | Feenstra et al. | |
| 2006/0098296 A1* | 5/2006 | Woodgate et al. | |
| 2006/0158729 A1* | 7/2006 | Vissenberg et al. | |
| 2008/0266388 A1* | 10/2008 | Woodgate et al. | |
| 2008/0284844 A1* | 11/2008 | Woodgate et al. | |
| 2008/0297880 A1* | 12/2008 | Steckl et al. | 359/291 |
| 2009/0046143 A1* | 2/2009 | Hiddink et al. | |

FOREIGN PATENT DOCUMENTS

| | | | |
|---|---|---|---|
| JP | 996777 | | 4/1997 |
| JP | 2000-347005 | | 12/2000 |
| JP | 2001215444 | | 8/2001 |
| JP | 2002-176660 | | 6/2002 |
| JP | 2002-357774 | | 12/2002 |
| JP | 2003-215478 | | 7/2003 |
| JP | 2004144874 | * | 5/2004 |
| JP | 2004258349 | | 9/2004 |
| JP | 2005115364 | | 4/2005 |
| WO | WO 03071335 | * | 8/2003 |
| WO | WO 2004075526 | * | 9/2004 |
| WO | WO 2004077124 A1 * | | 9/2004 |

OTHER PUBLICATIONS

International Search Report for corresponding Japanese Patent Application PCT/JP2006/313748 mailed Oct. 31, 2006.

* cited by examiner

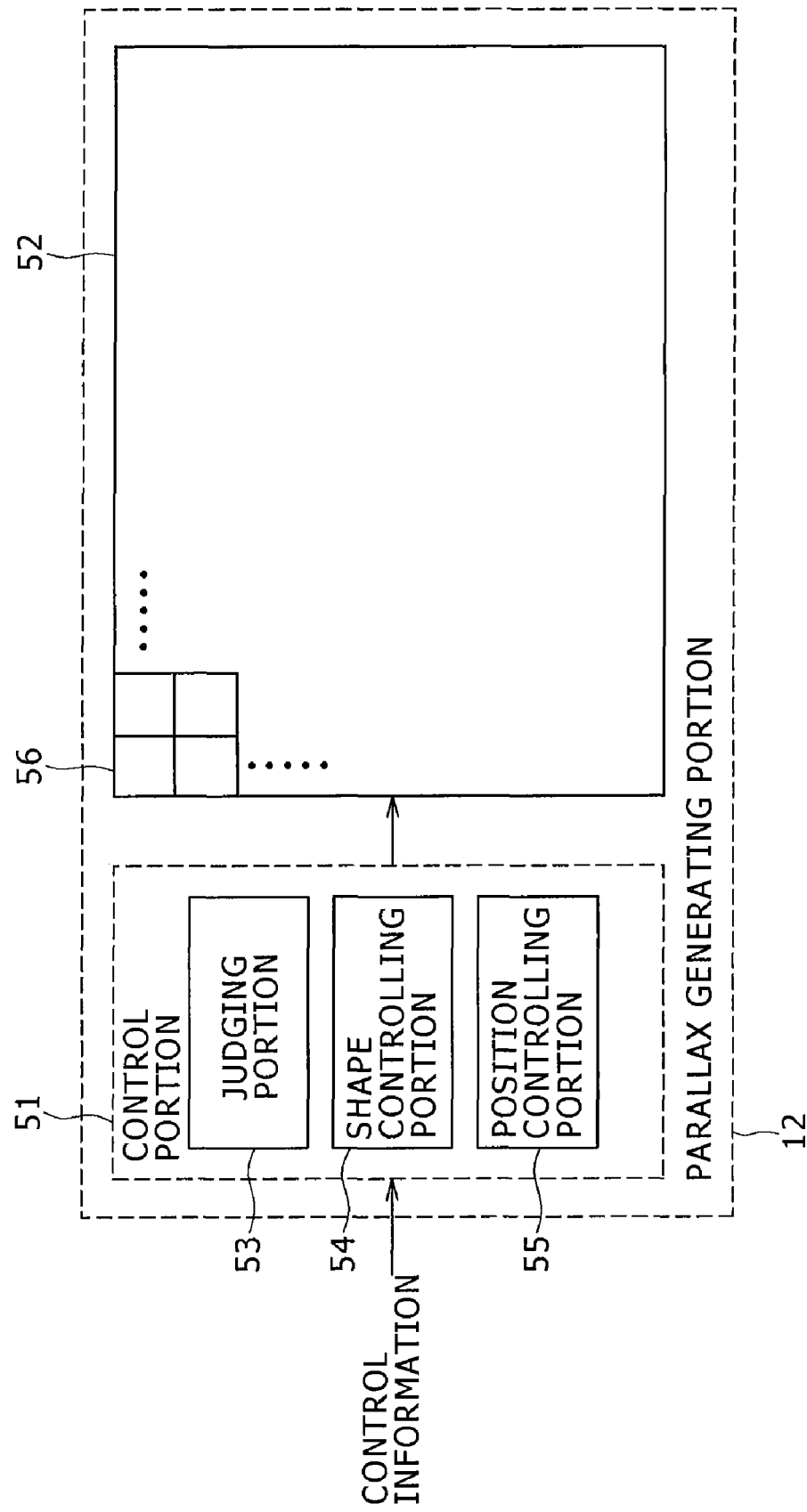

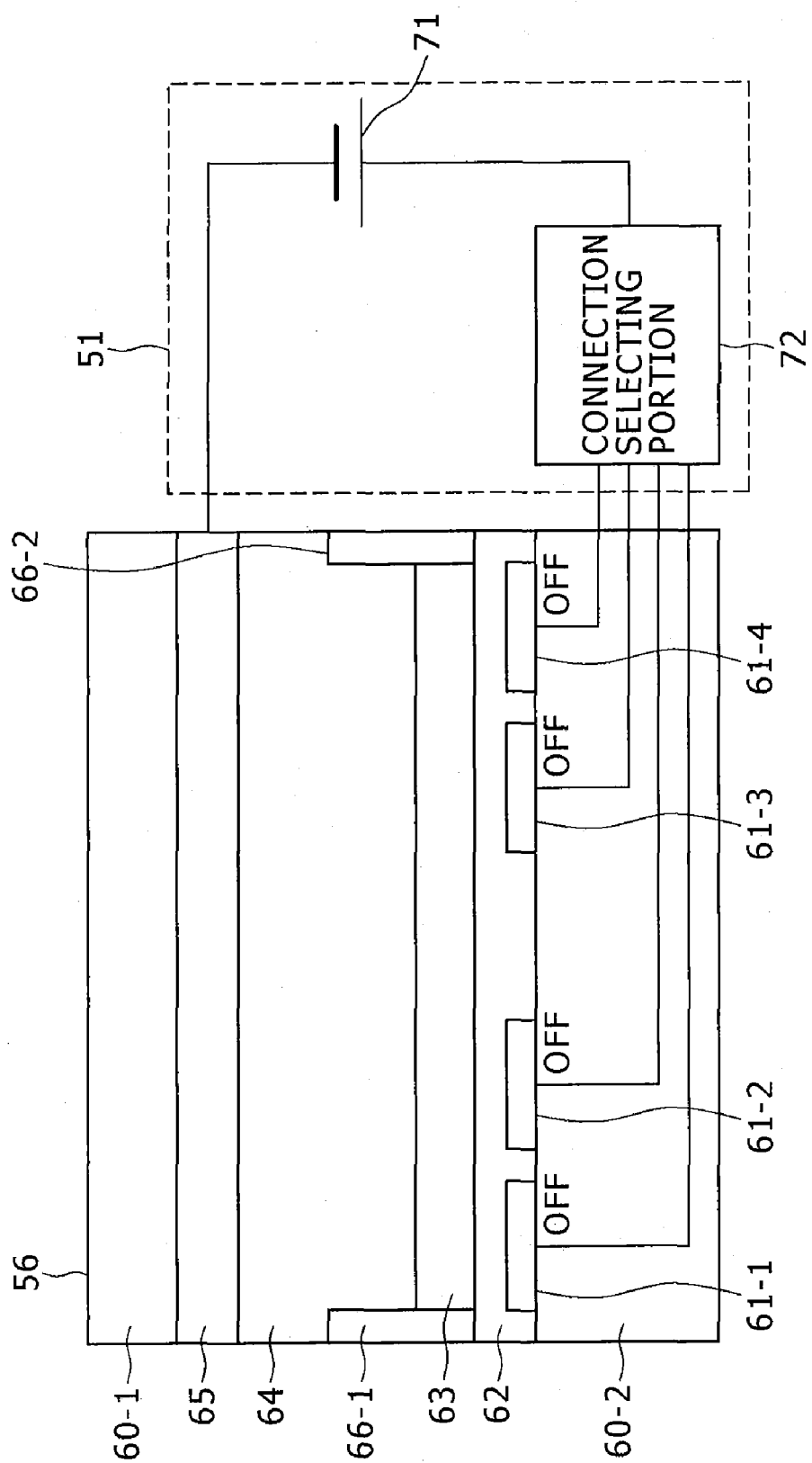

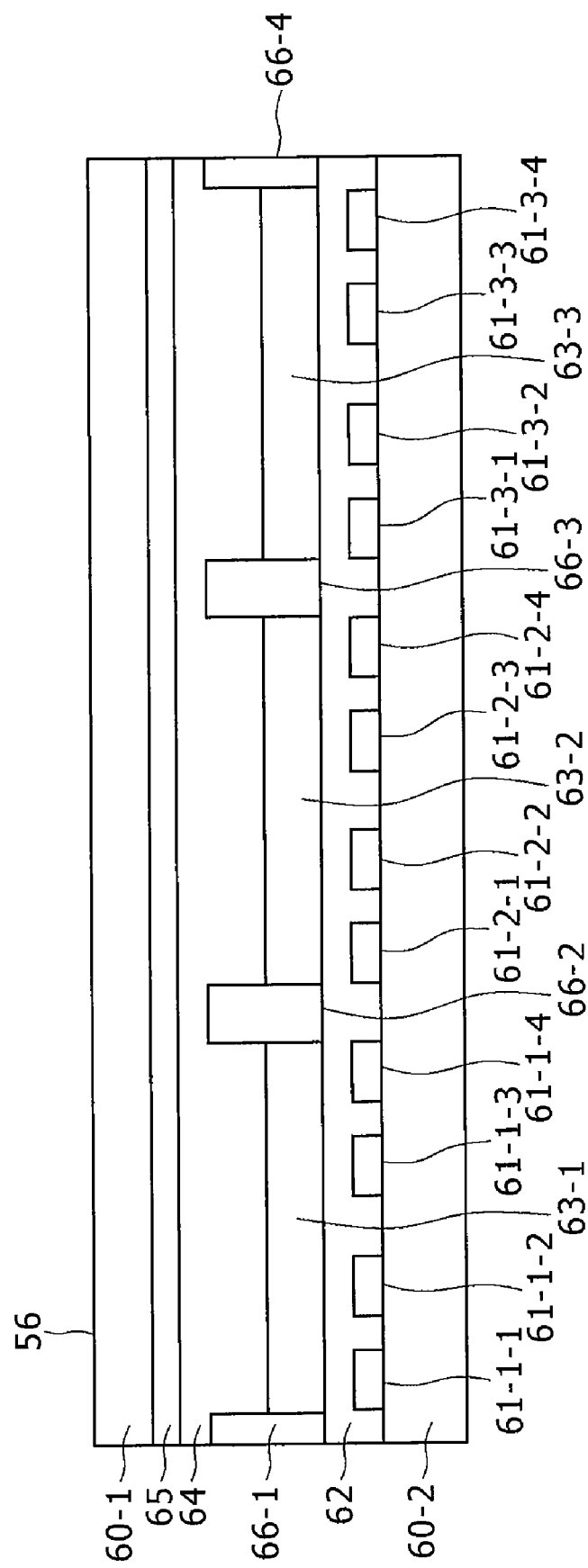

Y>A

Y<A

Y=A

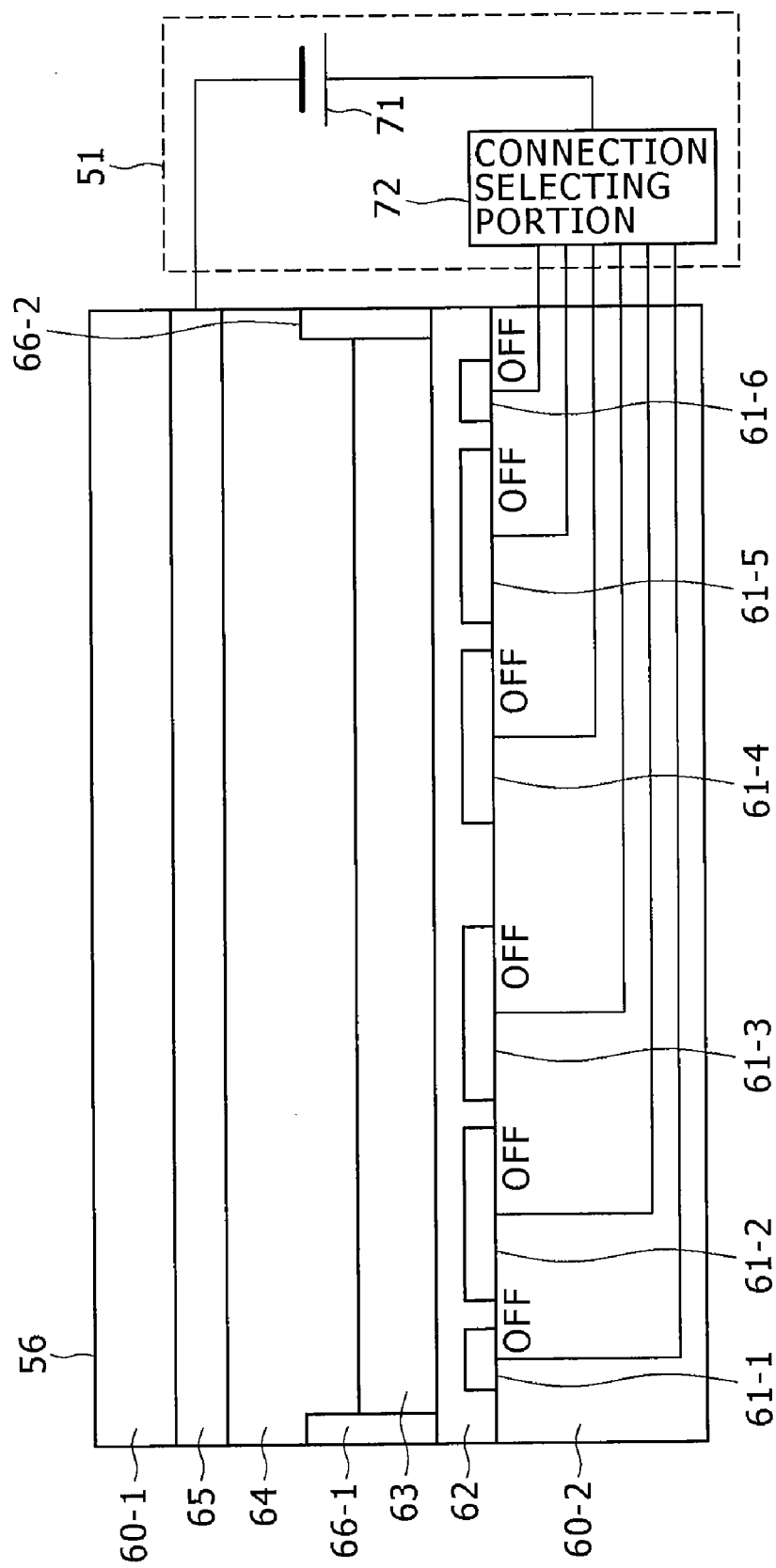

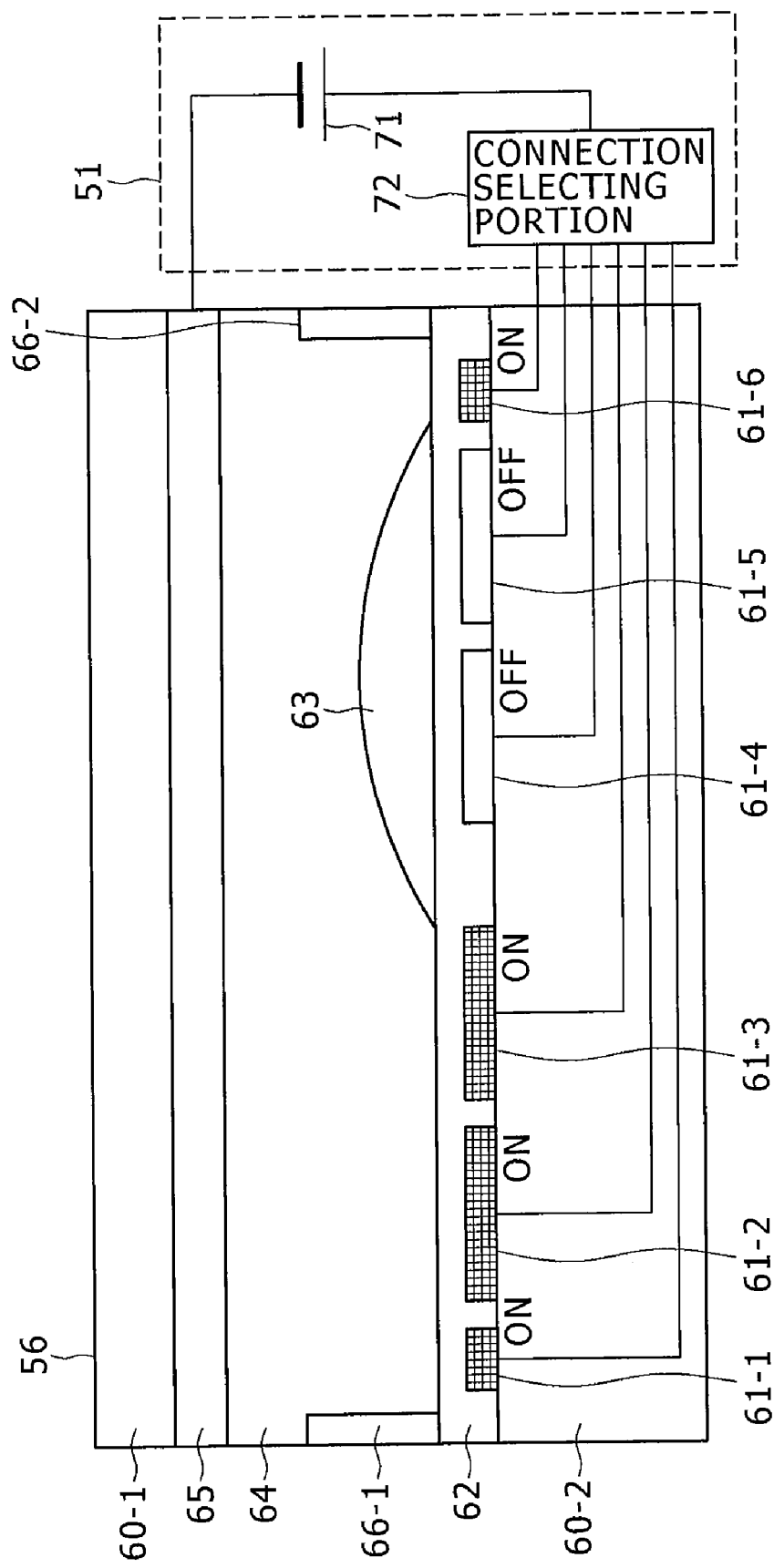

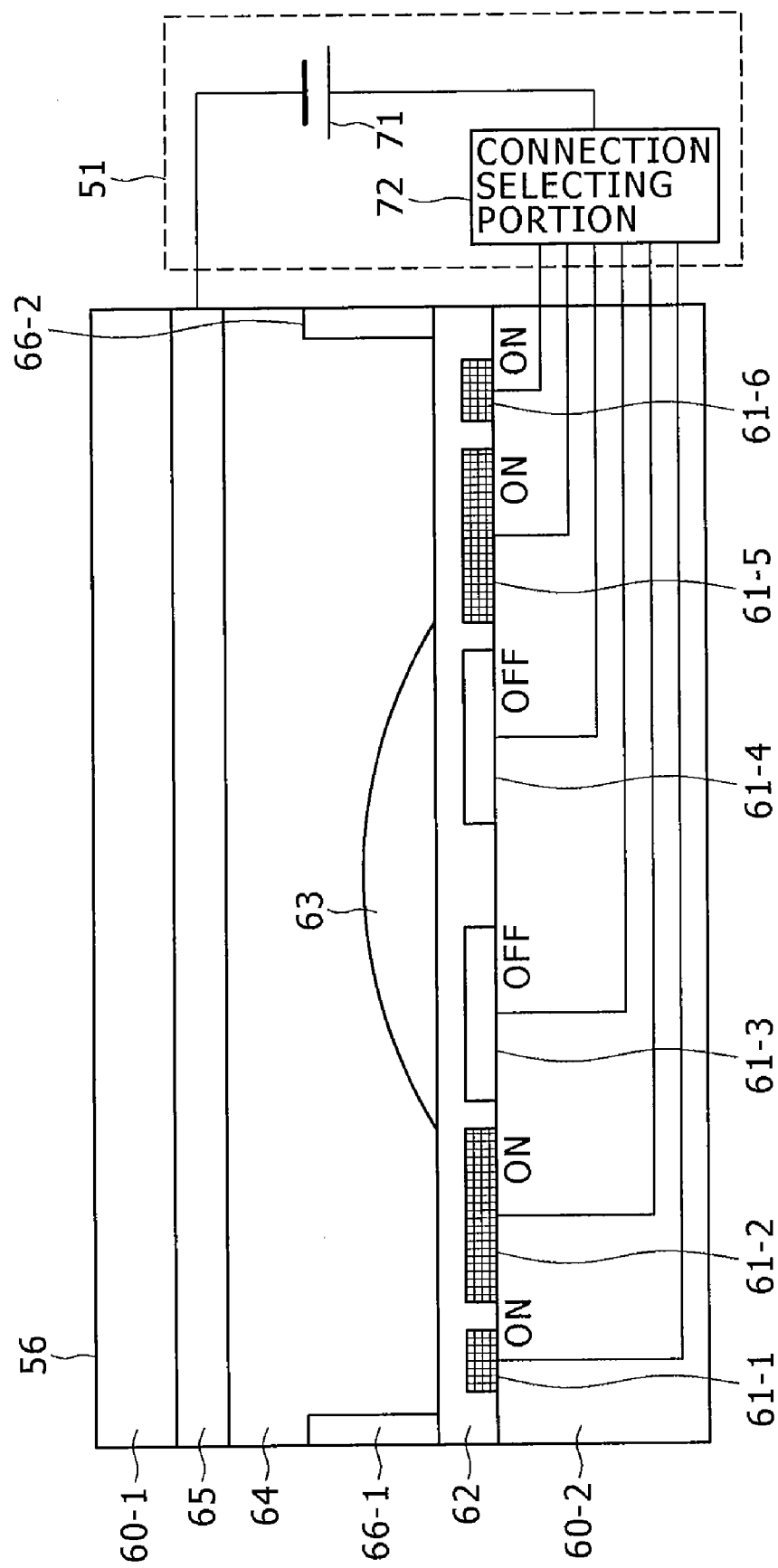

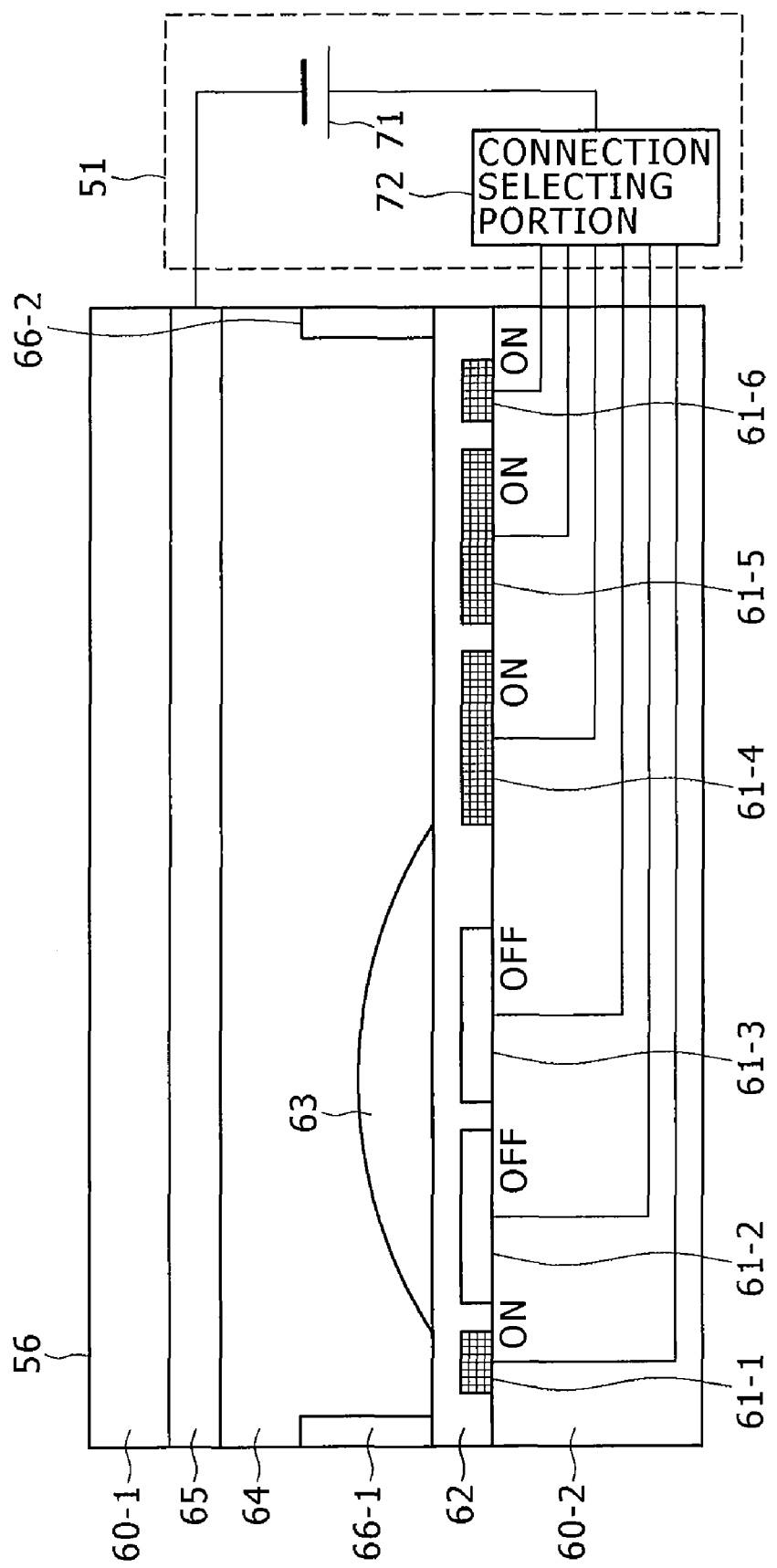

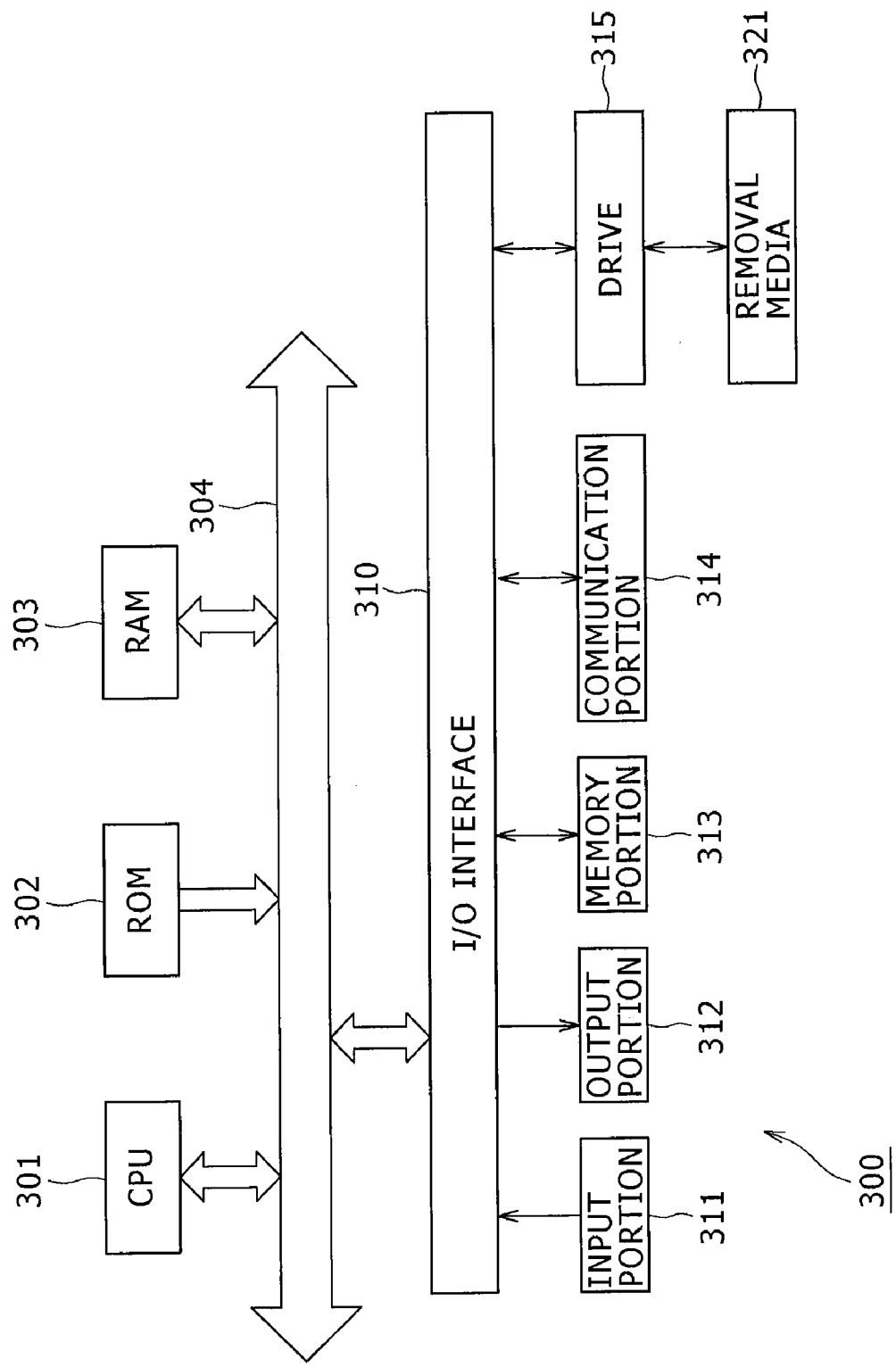

DISPLAY DEVICE, DISPLAY CONTROLLING METHOD, AND PROGRAM

CROSS REFERENCE TO RELATED APPLICATIONS

The present application claims priority to Japanese Patent Application No. 2005-211755, filed in the Japanese Patent Office on Jul. 21, 2005, the content of which is incorporated herein by reference.

BACKGROUND

Heretofore, a display device is devised which can switch two-dimensional display and three-dimensional display over to each other such that, for example, characters or the like are plane-displayed with high resolution being maintained and illustrations or the like are stereo-displayed. With regard to the stereo display method, there are proposed many systems such as a twin-lens system utilizing a binocular parallax, and a holography system for drawing a three-dimensional image in a space. However, these systems have both merits and demerits.

For example, the twin-lens system stereo display method which is in the progress of generally coining into wide use is a display system which can simply realize a binocular vision. In the case of this twin-lens system stereo display method, appearance of solidity is obtained by using only the binocular parallax as a physiological factor for the binocular vision. Actually, however, with regard to the physiological factor for the binocular vision, there are many factors such as the binocular parallax, vergence, focus adjustment, and a kinematic parallax. Thus, in the case of the twin-lens system stereo display method, it is pointed out that a contradiction is caused against other factors, and due to this contradiction thus caused, a viewer is easy to fatigue as compared with the case of a two-dimensionally displayed image.

In addition, for example, in the case of the holography system, a wavefront of a light can be reconstructed. As a result, all the physiological factors for the binocular vision can be fulfilled, and thus it is possible to obtain the natural stereo display which gives the viewer the less feeling of fatigue. Actually, in a hologram (still image) which is made on a dry plate by using a laser interference, such a stereo image as to have a strong resemblance to the real thing is obtained. However, in the case of electronic display, an amount of necessary data is enormous, and also a device is absent which can be controlled on the micron order or less as in the dry plate. Therefore, under the circumstances, it is very difficult to display a color stereo moving image.

Moreover, with regard to another method, for example, there is known a method called an integral photography method (hereinafter referred to as "an IP method") using many parallax images. This system is a relatively simple system composed of a lens array and a light source. Also, this system is a more real display system in which it is unnecessary for an observer to wear glasses, and an angle at which a stereo image is viewed changes depending on observing angles. For this reason, this system is expected as a stereo display system of the next generation.

That is to say, with this system, for a dedicated image which is two-dimensionally displayed, lights from pixels are deflected by the lens array, thereby generating parallaxes. Some lens arrays use solid micro-lenses, while a liquid lens with which a light is refracted by utilizing an interface between layers of liquids, thereby allowing a focal length to be freely changed can also be used in this lens array (for example, refer to Japanese Patent Laid-Open No. 2000-347005, U.S. Pat. No. 5,659,330, and Japanese Patent Laid-Open No. 2002-357774). By using such a liquid lens, a method of displaying an image, for example, switching between two-dimensional display and three-dimensional display can be readily carried out.

However, in the case of this system, when a lens system is made small in order to increase the resolution of the stereo display in a certain arbitrary pixel, the number of parallaxes (the number of pixels) in a unit lens decreases accordingly. Conversely, when a lens diameter is increased in order to increase the number of parallaxes, the resolution for the stereo display is reduced. That is to say, the increase in resolution for the stereo display and the increase in number of parallaxes as a barometer of the degree of solid show a relationship of tradeoff.

With regard to a method of increasing the number of parallaxes, for example, there is known a method of relatively moving a micro-lens array with respect to a luminescent pixel, thereby refracting the light in a plurality of directions (for example, refer to Japanese Patent Laid-Open No. 2002-176660). In addition, there is also known a method of controlling a position of a liquid droplet of the liquid lens (for example, refer to Japanese Patent Laid-Open No. 2003-215478).

However, for example, in the case of the method described in Japanese Patent Laid-Open No. 2003-215478, no concrete method with respect to the control for the position of the droplet is described. Even when the position of the liquid droplet is simply changed, for example, the lights emitted from the adjacent pixels overlap each other, a position where no light is emitted occurs, and so forth due to such a simple change unless the directions of emission of the lights (a refractive index or the like) can be properly controlled. Thus, there is the possibility that no image is properly displayed. That is to say, there is the possibility that the image quality of the output image is reduced.

SUMMARY

The present disclosure is in light of such circumstances, and therefore enables more parallaxes to be generated without reducing resolution and an image quality. The present disclosure relates to a display device, a display controlling method, and a program, and more particularly to a display device which is capable of generating more parallaxes without reducing resolution and an image quality, a display controlling method, and a program.

According to an embodiment, there is provided a display device, including: parallax image displaying means having a plurality of luminescent pixels disposed two-dimensionally, the parallax image displaying means serving to display two-dimensionally a parallax image as an image containing therein information on parallaxes with which a viewed image differs depending on a viewing position by causing the plurality of luminescent pixels to emit lights, respectively; and parallax generating means for generating parallaxes of the parallax image displayed by the parallax image displaying means; in which the parallax image displaying means is disposed so that lights emitted from the respective luminescent pixels are separated from one another at predetermined intervals on a display surface of the parallax image; and the parallax generating means includes: optical path controlling means composed of a plurality of liquid lenses disposed two-dimensionally, the optical path controlling means serving to control optical paths of the lights emitted from the plurality of different luminescent pixels of the parallax image displaying means based on a shape of an interface between a polar liquid having a polarity and a nonpolar liquid having no polarity, a refractive index of the polar liquid being different from that of the nonpolar liquid; and position controlling means for controlling a position of the nonpolar liquid of each of the liquid lenses of the optical path controlling means by utilizing the intervals, so that each of the liquid lenses emits the plurality of emitted lights passing through the corresponding one of the liquid lenses in a plurality of directions different from one another, thereby generating the parallaxes.

The luminescent pixels of the parallax image displaying means can be two-dimensionally disposed at predetermined intervals so that the respective emitted lights are separated from one another at predetermined intervals on the display surface of the parallax image.

Partitioning means for partitioning the emitted lights on the display surface of the parallax image can be provided between each two luminescent pixels of the parallax image displaying means.

The parallax image displaying means can further include light shielding means for shielding a part of each of the emitted lights so that the emitted lights from the respective luminescent pixels are separated from one another at predetermined intervals on the display surface of the parallax image.

The light shielding means can be a black matrix constituted by a net-like black member for light-shielding a willing portion and a transistor portion of each of the luminescent pixels.

The light shielding means can be a light shielding member having a plurality of pin holes for causing only vicinities of centers of the emitted lights from the different luminescent pixel to pass therethrough.

The light shielding means can be a diaphragm mechanism for controlling a light quantity of each of the emitted lights from the respective luminescent pixels.

The parallax image displaying means can cause an aperture ratio as a ratio of an area of a portion through which the emitted light is emitted to an area of an entire portion corresponding to one of the liquid lenses on the display surface of the parallax image to be an inverse number of the number, N, of luminescent pixels corresponding to the one of the liquid lens.

In the parallax generating means, the liquid lens can be provided in a position which is at a distance of a focal length of the liquid lens from the display surface of the parallax image of the parallax image displaying means; and the position controlling means can change the position of the nonpolar liquid by a length of each of portions of the liquid lenses through which the emitted lights are emitted, respectively, by controlling the position of the nonpolar liquid.

The liquid crystal lens of the optical path controlling means can include: a liquid portion for forming two layers in a passing direction of the emitted lights from the polar liquid and the nonpolar liquid; a plurality of first electrodes disposed on a plane vertical to the passing direction of the emitted lights; a second electrode disposed to face the plurality of first electrodes so as to sandwich the two layers of the liquid portion between each of the plurality of first electrodes and the second electrode; and voltage applying means for applying a voltage across each of the plurality of first electrodes and the second electrode, in which the position controlling means can control a position of the nonpolar liquid on the plane by selecting the first electrodes to which the voltage applying means applies the voltage for each of the liquid lenses of the optical path controlling means.

The parallax generating means can further include shape controlling means for controlling a shape of the interface between the nonpolar liquid and the polar liquid by selecting the first electrodes to which the voltage applying means applies the voltage for the each of liquid lenses of the optical path controlling means.

In an embodiment, the parallax image displaying means has the plurality of luminescent pixels disposed two-dimensionally, and two-dimensionally displays the parallax image as the image containing therein the information on the parallaxes with which the viewed image differs depending on the viewing position by causing the plurality of luminescent pixels to emit the lights, respectively. As a result, the parallaxes for the parallax image are generated.

According to an embodiment, there is provided a display controlling method or a program, including the steps of: two-dimensionally displaying a parallax image as an image containing therein information on parallaxes with which a viewed image differs depending on a viewing position by causing a plurality of luminescent pixels two-dimensionally disposed to emit lights, respectively, while the emitted lights from the respective luminescent pixels are separated from one another at predetermined intervals; and changing a position of the nonpolar liquid of each of a plurality of liquid lenses disposed two-dimensionally for controlling optical paths of the emitted lights from the respective luminescent pixels based on a shape of an interface between a polar liquid having a polarity and the nonpolar liquid having no polarity in correspondence to the predetermined intervals, a refractive index of the polar liquid being different from that of the nonpolar liquid, so that each of the liquid lenses emits the plurality of emitted lights in a plurality of directions different from one another, respectively, thereby generating the parallaxes.

In the above embodiments, the parallax image as the image containing therein the information on the parallaxes with which the viewed image differs depending on the viewing position is two-dimensionally displayed while the emitted lights from the respective luminescent pixels are separated from one another at the predetermined intervals by causing the plurality of luminescent pixels two-dimensionally disposed to emit the lights, respectively. In addition, the position of the nonpolar liquid of each of the plurality of liquid lenses two-dimensionally disposed for controlling the optical paths of the emitted lights from the respective luminescent pixels based on the shape of the interface between the polar liquid having the polarity and the nonpolar liquid having no polarity is changed in correspondence to the predetermined intervals, the refractive index of the polar liquid being different from that of the nonpolar liquid. As a result, the plurality of emitted lights which pass through corresponding one of the liquid lenses are emitted in the plurality of directions different from one another, respectively, thereby generating the parallaxes.

According to an embodiment, the image can be displayed. In particular, the number of parallaxes generated from the lenses can be increased without reducing the resolution and the image quality.

Additional features and advantages are described herein, and will be apparent from, the following Detailed Description and the figures.

BRIEF DESCRIPTION OF THE FIGURES

FIG. 4 is a diagram showing a detailed structural example of a parallax generating portion of FIG. 1.

FIG. 5 is a diagram showing a detailed structural example of a liquid lens portion of FIG. 4.

FIG. 6 is a view showing an example of arrangement of liquid lenses shown in FIG. 5.

FIG. 17 is a schematic view showing another structural example of the liquid lens portions.

FIG. 18 is a view showing an example of movement of the nonpolar liquid in the example of FIG. 17.

FIG. 19 is a view showing another example of movement of the nonpolar liquid in the example of FIG. 17.

FIG. 20 is a view showing still another example of movement of the nonpolar liquid in the example of FIG. 17.

FIG. 25 is a view showing an example of a configuration of a personal computer to which the present invention is applied.

DETAILED DESCRIPTION

Figure 1:
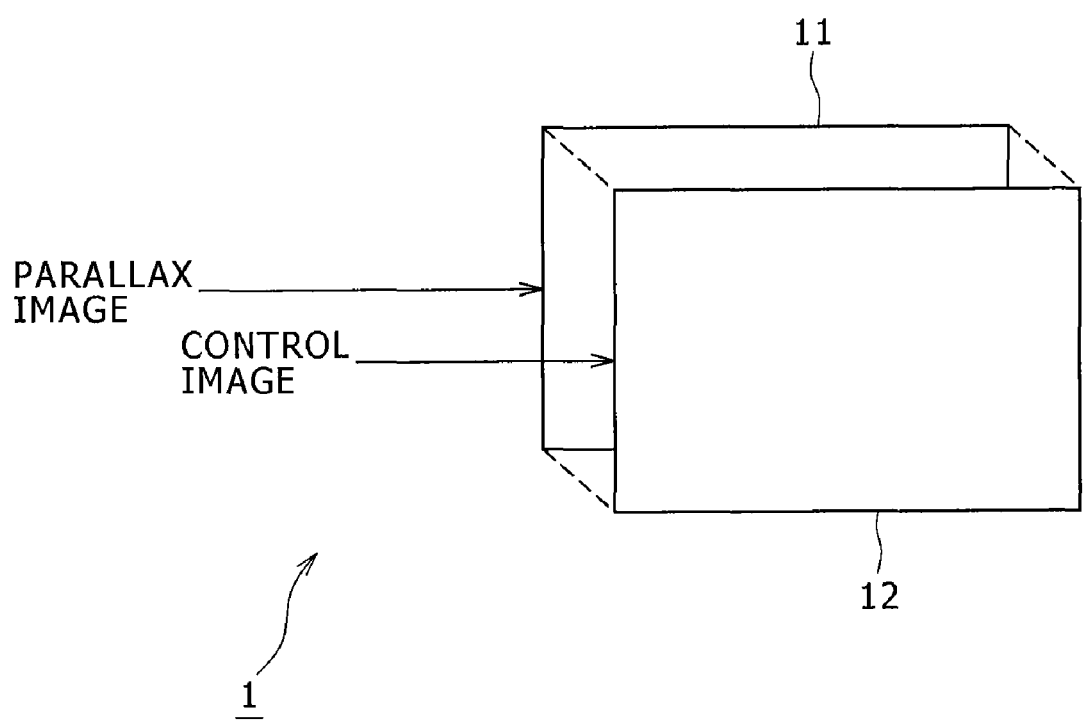
FIG. 1 is a view representing a constitution of an embodiment of a parallax image displaying device.

The following reference numerals relate to elements as follows: 1 parallax image displaying device, 11 parallax image displaying portion, 12 parallax generating portion, 21 display controlling portion, 28 separator, 31 black matrix, 35 pin hole filter, 41 diaphragm, 51 control portion, 52 optical path controlling portion, 53 judging portion, 54 shape controlling portion, 55 position controlling portion, 56 liquid lens portion, 60 transparent plate, 61 lower electrode, 62 insulator, 63 nonpolar liquid, 64 polar liquid, 65 upper electrode, 66 rib, 72 connection selecting portion, 200 wavefront control type display device, 211 signal separating portion, 212 circuit for driving two-dimensionally image displaying portion, 213 two-dimensionally image displaying portion, 214 luminescent pixel, 215 circuit for driving wavefront controlling portion, 216 wavefront controlling portion, 217 liquid lens portion.

FIG. 1 shows a constitution of an embodiment of a parallax image displaying device. The parallax image displaying device 1 has a parallax image displaying portion 11 and a suggestion generating portion 12.

The parallax image displaying portion 11 causes luminescent pixels to emit lights, respectively, as will be described later based on data, supplied from the outside, on a parallax image as an image containing therein information on a parallax, thereby displaying (two-dimensionally displaying) the parallax image in the form of a plane image.

The parallax image is an image containing therein information on the parallax. The parallax means that even when one thing is viewed, the one thing is viewed as images different from one another depending on viewing positions. For example, the IP method as one of the stereo display methods is utilized in order to reconstruct that a viewed solid object (visual image) differs depending on an angle at which the solid object is viewed. That is to say, for a user who views one sheet of parallax image displayed so as to generate the parallaxes, an image (contents of the parallax image) looks like an image differing depending on the viewing position (for example, depending on a longitudinal direction).

The parallax image is generated in a combination form by utilizing a predetermined method of transversely dividing each of a plurality of images different from one another, for example, each of two sheets of images one pixel by one pixel, and alternately combining the images obtained through the division with one another. In this case, the parallax image is constructed by one images every other row (every other pixel) in a transverse direction. Also, in the parallax image, the images of the remaining rows (that is, alternate rows) are constructed by the other images. Therefore, even when a user directly views the parallax image two-dimensionally displayed on the parallax image displaying portion 11, since a plurality of images are contained in the parallax image, he/she cannot properly understand these images.

However, as will be described later, when viewing the parallax image two-dimensionally disposed on the parallax image displaying portion 11 through the parallax generating portion B2 which is operated so as to generate the parallaxes, the user can view the image corresponding to the his/her viewing position.

It is noted that although one example of the method of processing the parallax image has been described so far, with regard to the method of synthesizing the images, any of other methods other than the method described above may be of course be adopted as long as it corresponds to the parallax generating method in the parallax generating portion.

The parallax generating portion 12 is superimposed on a surface of the parallax image displaying portion 11 on which the parallax image is intended to be displayed. The parallax generating portion 12, as will be described later, has a liquid lens group with which a lens effect is obtained by utilizing an interface between liquids. The parallax generating portion 12 generates parallaxes of the parallax image displayed on the parallax image displaying portion 11 based on control information supplied from the outside by utilizing this lens effect of the liquid lens group.

That is to say, the parallax image displaying device 1 of FIG. 1 displays the parallax image in the parallax image displaying portion 11, and generates the parallaxes of the displayed parallax image in the parallax generating portion 12 installed so that the liquid lenses are made to correspond to pixels of the parallax image displaying portion 11, respectively, thereby displaying an image containing therein the parallaxes. In a word, the image displayed by the parallax image displaying device 1 looks like an image which differs depending on a position where the image is viewed (the parallaxes are generated).

At this time, since the parallax image displaying device 1, as will be described later, increases the number of parallaxes while exactly controlling emission directions of emitted lights from a display screen, the number of parallaxes of the parallax image can be increased without reducing the resolution and the image quality.

Figure 2A:
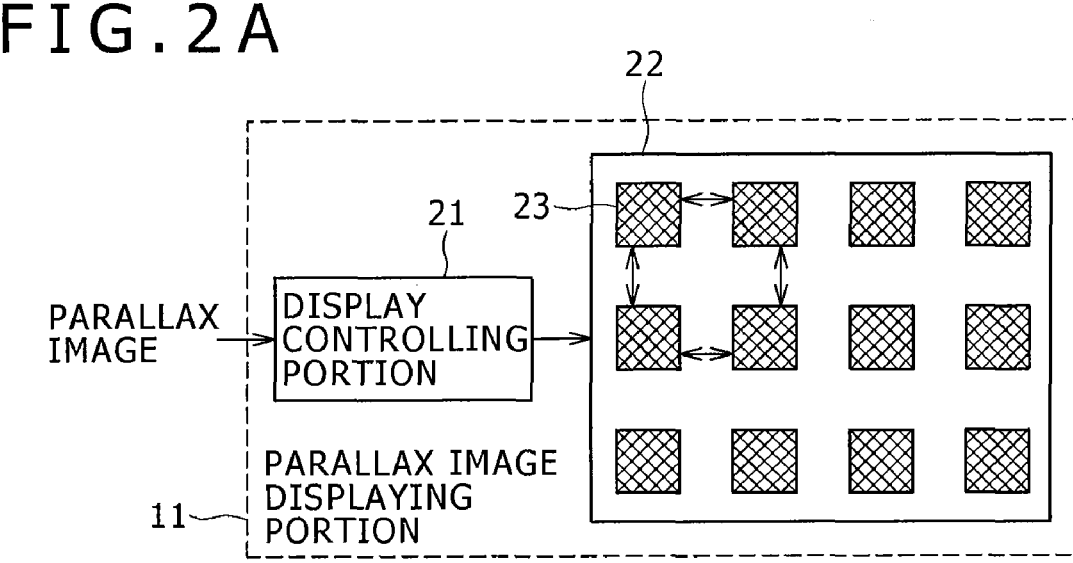
FIGS. 2A to 2C are diagrams showing a detailed structural example of a parallax image displaying portion of FIG. 1.

FIG. 2A is a diagram showing a detailed structural example of the parallax image displaying portion 11 of FIG. 1. As shown in FIG. 2A, the parallax image displaying portion II has a display controlling portion 21 and a display portion 22. The display controlling portion 21 executes processing for controlling the display portion 22 based on data on the parallax image supplied from the outside, thereby causing the display portion 22 to display thereon the parallax image in a two-dimensional display form (in a plane form).

The display portion 22 has a plurality of luminescent pixels 23 which are developed in a plane form (which are disposed in array (in matrix)). The luminescent pixels publish, respectively, in accordance with the control made by the display controlling portion 21, which results in that the display portion 22 displays thereon the parallax image. The display portion 22, for example, may be a display device using semiconductor light emitting elements as the luminescent pixels 23. Or, any of other displays such as a liquid crystal display (LCD), an organic electro luminescence (EL) display, a field emission display (FED), a plasma display panel (PDP), an electro chromic display, a display device using a fluorescent display tube, a display device using a cathode ray tube, and a projector may also be adopted as the display portion 22 as long as it can display thereon the parallax image containing therein the parallaxes which are generated in the parallax generating portion 12 which will be described later.

The luminescent pixels 23 are elements which are disposed in array on the display portions 22, and have light emitting elements, respectively, each of which can emit a light in single color or in full color. In the parallax image display surface of the display portion 22, a luminescent portion (light emitting portion) of such a luminescent pixel is at a predetermined distance from each of luminescent portions of the luminescent pixels adjacent thereto as indicated by double sided arrows.

The display portion 22 separates the emitted lights from the respective pixels from one another to hold predetermined intervals for the emitted lights, which results in that as will be described later, the parallax generating portion 12 can properly control the emission directions of the respective lights so as to suppress unevenness of the emitted lights (for example, generation of a position where the emitted lights overlap each other, or none of the lights reaches). That is to say, the parallax image displaying portion 1, as will be described later, can generate more parallaxes without reducing the resolution and the image quality.

Figure 2B:
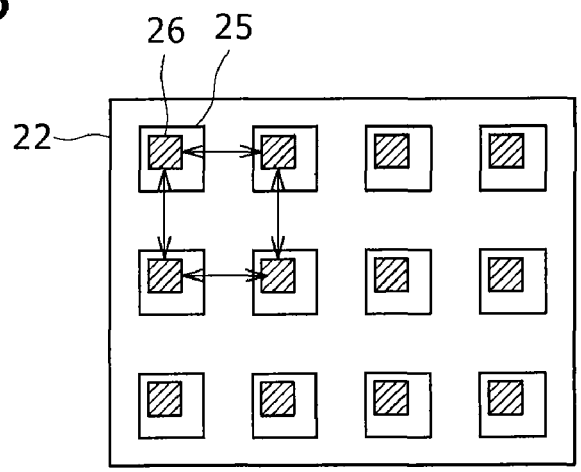

Note that, all that is required is that the emitted lights from the respective luminescent pixels are separated from one another on the display surface of the parallax image. That is to say, all that is required is that partial images corresponding to the respective luminescent pixels are separated from one another in the parallax image displayed on the display portion 22. Therefore, in the display portion 22, as shown in FIG. 2B, the entire luminescent pixels 25 each including the wiring and the transistor portion may be separated from one another, or may not be separated from one another as long as the light emitting elements 26 of the respective luminescent pixels 25 are disposed away from one another as indicated by double sided arrows.

Moreover, a lattice-like separator 28 for partitioning the emitted lights from the respective pixels, and deflecting the emitted lights from the respective pixels in front of the display surface may be provided between each two adjacent light emitting elements 26 (each two adjacent luminescent elements). The separator 28 is provided in the form of a projecting portion becoming a wall for partitioning each two adjacent pixels in the display surface of the display portion 22. As a result, the light emitting elements 26 are provided in recess portions different from one another, respectively.

The provision of such a separator 28 makes it possible for the parallax image displaying portion 11 to more precisely separate the emitted lights from the respective luminescent pixels from one another. That is to say, the parallax generating portion 12 can more precisely and properly the emission directions of the respective lights, and the parallax image displaying device 1 can generate more parallaxes without reducing the resolution and the image quality.

Figure 3A:
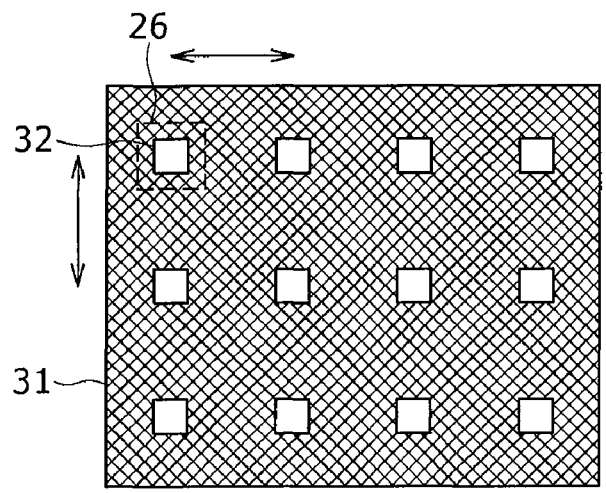
FIGS. 3A to 3C are diagrams showing a detailed structural example of a parallax image displaying portion of FIG. 1.

In addition, as shown in FIG. 3, any of various light shielding objects may be provided in front of the display portion 22. For example, as shown in FIG. 3A, a black matrix 31 for light-shielding the wirings and the transistor portions of the respective luminescent pixels may be provided in the display portion 22, and may separate the emitted lights from the respective pixels (so as to hold predetermined intervals) from one another. The provision of the black matrix 31 makes it possible for the parallax image displaying portion 11 to more precisely separate the emitted lights from the respective luminescent pixels from one another. For example, as shown in FIG. 3A, a size of each of opening portions 32 of the black matrix 31 which are provided so as to correspond to the light emitting portions of the luminescent pixels, respectively, is adjusted, which results in that the intervals of the light emitting elements 26, that is, the intervals of portions through which the lights pass to the front of the black matrix 31 (indicated by double sided arrows) can be made predetermined intervals.

Figure 3B:
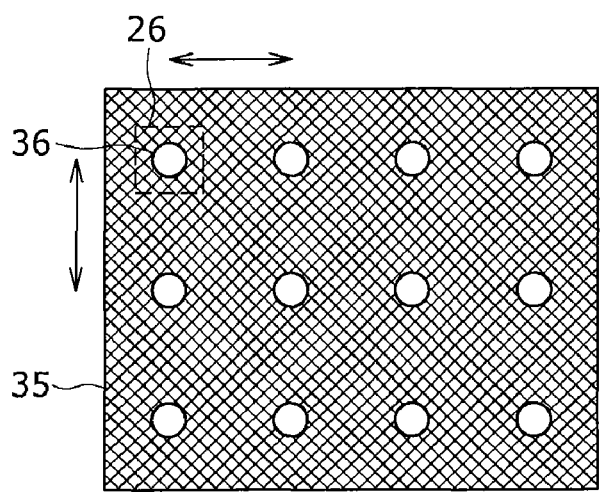

In addition, as shown in FIG. 3B, a pin hole filter 35 as a filter having pin holes provided therein for carrying out light-shielding so as not to emit forward a part of the emitted light from the respective light emitting elements 26, and limiting the emission directions of the remaining emitted lights which are not shielded may also be provided. That is to say, the pin hole filter 35 is made of a light-shielding member, and pin holes 36 each having a predetermined size are provided in portions of the light-emitting elements 26, respectively. That is to say, the emitted lights from the respective light emitting elements 26 pass through the respective pin holes 36 to be outputted in front of the pin hole filter 35 vertically to the front of the pin hole filter 35. As a result, the lights outputted through the respective pin holes are emitted so as to keep a space between each two adjacent emitted lights at the predetermined intervals as indicated by double sided arrows.

Figure 3C:
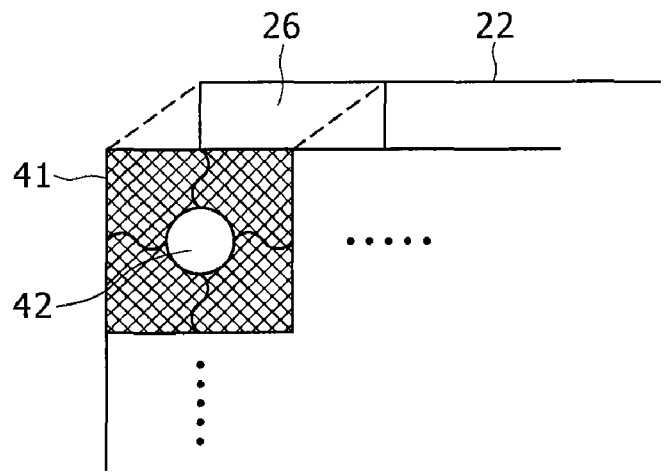

Moreover, as shown in FIG. 3C, a diaphragm 41 for adjusting a light quality of corresponding one of the emitted lights from the respective light emitting elements may also be provided. In FIG. 3C, the diaphragms 41 are provided in array so as to correspond to the light emitting elements 26, respectively, and a size of an opening portion 42 of each of the diaphragms 41 can be adjusted. That is to say, the diaphragms 41 adjust the qualities of lights, made to pass therethrough forward, of the emitted lights from the respective light emitting elements 26 by adjusting the sizes of the respective opening portions 42. That is to say, the diaphragms 41 can separate the emitted lights from the respective light emitting elements from one another so as to keep the predetermined intervals between each two adjacent emitted lights by adjusting the sizes of the respective opening portions 42.

As described above, any of the various light shielding objects such as the black matrix 31, the pin hole filter 32, or the diaphragms 41 is provided in front of the front (the display surface of the parallax image) in the display portion 22, which results in that the parallax image displaying portion 11 can more precisely separate the emitted lights from the respective luminescent pixels from one another. That is to say, the parallax generating portion 12 can more precisely, properly control the emission directions of the respective lights, and the parallax image displaying device 1 can generate more parallaxes without reducing the resolution and the image quality.

Figure 2C:
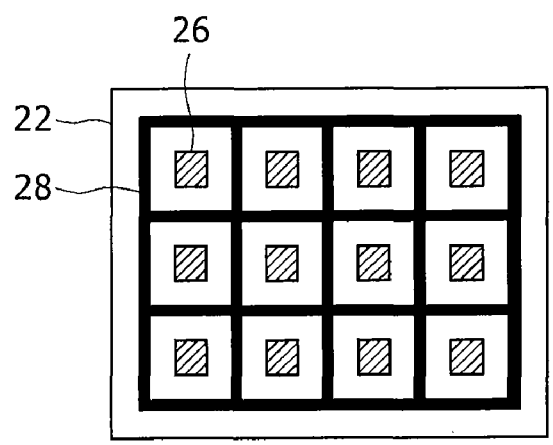

It is noted that although the luminescent pixels (or the light emitting elements) of 12=3 height×4 width are provided in FIGS. 2 and 3 (in FIGS. 2A to 2C and in FIGS. 3A and 3B), actually, the number of luminescent pixels may be arbitrarily set.

FIG. 4 is a diagram showing a detailed structural example of the parallax generating portion 12 of FIG. 1.

The parallax generating portion 12 has a control portion 51 and an optical path controlling portion 52. The control portion 51 is a processing portion for controlling the optical path controlling portion 51 in accordance with control information supplied from the outside, and executing control processing for generation of the parallaxes of the parallax image displayed on the parallax image displaying portion 11. The control portion 51 has a judging portion 53, a shape controlling portion 54, and a position controlling portion 55. The judging portion 53 carries out various judgments. The shape controlling portion 54, as will be described later, executes control processing for a shape of the nonpolar liquid of the liquid lens, and the position controlling portion 55 executes control processing for a position (change) of the nonpolar liquid.

It is noted that the judging portion 53, the shape controlling portion 54 and the position controlling portion 55 show functions, respectively, which the control portion 51 has and can actually communicate information either with one another or with the outside.

The optical path controlling portion 52 controls optical paths of the respective emitted lights from the parallax image displaying portion 11. That is to say, the optical path controlling portion 52 generates the parallaxes of the parallax image displayed on the parallax image displaying portion 11. The optical path controlling portion 52 has a plurality of liquid lens portions which are disposed in array (in a plane form) on a plane facing the display surface of the parallax image in the parallax image displaying portion 11. The liquid lens portions 56 are constituted by the liquid lenses or the like for controlling the optical paths of the passing lights, respectively, by utilizing an interface between the liquids, and are disposed so as to correspond to a plurality of pixels different from one another of the parallax image displaying portion 11. That is to say, the liquid lens portions 56 are provided so as to face a plurality of luminescent pixels (a group of luminescent pixels different from one another for the liquid lens portions 56) of the parallax image displaying portion 11, respectively, so that the emitted lights from the respective luminescent pixels pass through the liquid lens portions 56, respectively.

FIG. 5 is a view showing a detailed structural example of the liquid lens portion 56 of FIG. 4, and is a schematic view showing a structural example of a cross section when the liquid lens portion 56 is cut along the passing direction of the light. In FIG. 5, the liquid lens portion 56 has lower electrodes 61-1 to 61-4, an insulator 62, a nonpolar liquid 63, a polar liquid 64, an upper electrode 65, and ribs 66-1 and 66-2 which are all sandwiched between transparent plates 60-1 and 60-2.

In FIG. 5, the parallax image displaying portion 11 is disposed on a lower side of the liquid lens 56. Thus, the emitted light from the parallax image displaying portion 11 passes through the liquid lens portion 56 vertically from a lower side to an upper side in FIG. 5.

An uppermost layer of the liquid lens portion 56 is the transparent plate 60-1, and a lowermost layer thereof is the transparent plate 60-2. The transparent plates 60-1 and 60-2 are each made of a transparent material such as a glass or a plastic, and are structured as a chassis for sandwiching the individual layers of the liquid lens portion 56 between them. That is to say, the transparent plates 60-1 and 60-2 are structured so as not to impede the emitted light passing through the liquid lens portion 56 as much as possible. It is noted that in the following description, the transparent plates 60-1 and 60-2 are simply referred to as the transparent plates 60 when there is no necessity for explaining the transparent plates 60-1 and 60-2 distinctly from each other.

The four electrodes of the lower electrodes 61-1 to 61-4 are provided on a plane vertical to the passing direction of the light on the upper side of the lowermost transparent plate 60-2. Each of the lower electrodes 61-1 to 614 is a strip (line-like) electrode (line electrode), and is the transparent electrode made of a material such as an indium oxide (ITO) or a zinc oxide (ZnO). Each of the lower electrodes 61-1 to 61-4, for example, is made by forming a thin film made of the indium oxide (ITO) or the zinc oxide (ZnO) on a surface of the transparent plate 60-2 by utilizing a predetermined method.

The lower electrodes 61-1 to 61-4 are desirably structured so as not to impede the emitted light passing through the liquid lens portion 56 by using the transparent electrodes in such a manner. As will be described later, any of the lower electrodes 61-1 to 61-4 is an electrode which is paired with the upper electrode 65, and a predetermined voltage is applied across one(s) of the lower electrodes 61-1 to 61-4, and the upper electrode 65 when necessary. It is noted that in the following description, the lower electrodes 61-1 to 614 are simply referred to as the lower electrodes 61 when there is no necessity for explaining the lower electrodes 61-1 to 61-4 distinctly from one another.

The individual layers of the insulator 62, the nonpolar liquid 63, and the polar liquid 64 are formed in this order from the lower side between each of the lower electrodes 61-1 to 61-4, and the upper electrode 65.

The insulator 62, for example, is made of a material such as PVdF or PTFE as a fluorine system polymer. In this case, a material which has a large hydrophobic property and a large permittivity is desirable as such a material. In this connection, although a thickness is desirably thinner in order to increase the permittivity, the thickness is desirably thicker from a viewpoint of an insulation strength, and thus an optimal value thereof is determined based on blend of both the cases. For example, when a thickness of Teflon (registered trademark) (E. I. du Pont de Nemours and Company) was set at 0.5 μm, the insulator 62 showed no breakdown until 40 V in experiments in the case where each of the lower electrodes 61 was the ITO electrode, the insulator 62 was made of Teflon (registered trademark) with 0.5 μm thickness, the nonpolar liquid 63 was dodecane with 25 μm thickness, the polar liquid 64 was water with 100 μm thickness, and the upper electrode 65 was the ITO electrode. It is noted that the insulator 62 is also desirably structured so as not to impede the emitted light passing through the liquid lens portion 56 as much as possible by using the transparent material.

A hydrocarbon system material such as decan, dodecan, hexadecane or undecane, a silicon oil having a high refractive index, or 1,1-diphenylethlene is used as the material for the nonpolar liquid 64. The liquid material for the nonpolar liquid 63 is not especially limited as long as its shape changes due to a change in wettability with each of the insulator 62 and the polar liquid 64 through application of the voltage across one(s) of the lower electrodes 61, and the upper electrode 65.

Water, an aqueous solution in which an electrolyte such as kalium chloride or natrium chloride is dissolved, or alcohol such as methyl alcohol or ethyl alcohol having a small molecular weight is used as the liquid material for the polar solution 64. It is noted that the liquid material for the polar solution 64 is not especially limited as long as its shape changes due to a change in wettability with the nonpolar liquid 63 through application of the voltage across one(s) of the lower electrodes 61, and the upper electrode 65. Note that, it is preferable for the polar liquid 64 and the nonpolar liquid 63 that they are not mixed with each other, their refractive indexes are largely different from each other, and each of them has a low viscosity (based on a viewpoint of a shape changing speed).

The upper electrode 65 is an electrode corresponding to each of the lower electrodes 61, and is made of the same material as that of each of the lower electrodes 61 so as to be formed on a lower surface of the transparent plate 60-1 by utilizing the same method as that for each of the lower electrodes 61. That is to say, the upper electrode 65 is also the transparent electrode which is made by forming the thin film made of the indium oxide (ITO) or the zinc oxide (ZnO). Ideally, the upper electrode 65 is structured so as not to impede the emitted light passing through the liquid lens portion 56. It is noted that unlike the lower electrodes 61 composed of a plurality of electrodes, the upper electrode 65 is one electrode (solid electrode) which is formed throughout the liquid lens portion 56. That is to say, the upper electrode 65 faces any of the lower electrodes 61-1 to 61-4 in the passing direction of the light.

The light which is intended to pass through the liquid lens portion 56 passes through the individual layers of the transparent plate 60-2, (the lower electrode 61) the insulator 62, (the nonpolar liquid 63) the polar liquid 64, the upper electrode 65, and the transparent plate 60-1. It is noted that the layers of the lower electrodes 61 are not formed throughout the plane through which the light passes, and thus have gaps formed therein as shown in FIG. 5. As a result, the light does not pass these layers depending on the passing position in some cases. In addition, since the layer of the nonpolar liquid 63 is deformed due to the application of the voltage across one(s) of the lower electrodes 61 and the upper electrode 65, the light does not pass this layer depending on the passing position or the like in some cases.

The ribs 66-1 and 66-2 are partitions for partitioning the liquid lens portions 56 disposed in array. More specifically, the ribs 66-1 and 66-2 partition the layer of the nonpolar liquid 63 of the liquid lens portion 56. Each of the ribs 66-1 and 66-2 is one net-like (lattice-like) partitioning member. In other words, each of the portions obtained through the partition by the ribs 66-1 and 66-2 is structured as one liquid lens portion 56. When in the following description, there is no necessity for explaining the ribs 66-1 and 66-2 distinctly from each other, the ribs 66-1 and 66-2 are simply referred to as the ribs 66.

Each of the ribs 66 is desirably dissolved in neither of the polar liquid 64 and the nonpolar liquid 63, and makes a reaction with none of them as, for example, in an epoxy system or acrylic system resin or the like. Typically, a macromolecular resin is used for each of the ribs 66, and the epoxy system or acrylic system resin, for example, is used as the material for each of the ribs 66. It is noted that each of the ribs 66 is desirably made of an opaque member not transmitting the light.

It is noted that in the liquid lens portion 56, as will be described later, the voltage is suitably applied across one(s) of the lower electrodes 61 and the upper electrode 65 to control the shape and the position of the polar liquid 64, thereby controlling the shape and the position of the nonpolar liquid 63, and controlling the optical path of the passing light by the interface between the nonpolar liquid 63 and the polar liquid 64. That is to say, the ribs 66 partition the nonpolar liquid 63, thereby making it possible to partition the structures of the liquid lens portions 56. Therefore, although the liquid lens portions 56 are disposed in array (partitioned by the ribs 66), actually, as shown in FIG. 6, each liquid lens portion 56 shares any of the sharable members with other liquid lens portions 56. For example, in the case of an example of FIG. 6, the transparent plate 60-1, the transparent plate 60-2, the insulating layer 62, the polar liquid 64, and the upper electrode 65 are shared among all the liquid lens portions 56, and the ribs 66 (for example, the rib 66-2 and 66-3) are shared between each two adjacent liquid lens portions 56.

That is to say, in the case of the example shown in FIG. 6, only the nonpolar liquid 63 for controlling the optical path, and the lower electrodes 61 (lower electrodes 61-1-1 to 61-1-4, lower electrodes 61-2-1 to 61-2-4, and lower electrodes 61-3-1 to 61-3-4) for controlling the positions of the respective nonpolar liquids 63 are provided every liquid lens portion 56 (or every finer unit), and other constituent elements are shared among all the liquid lens portions 56.

Referring back to FIG. 5, in the liquid lens portion 56 having such a structure, the voltage is applied across one(s) of the lower electrodes 61 and the upper electrode 65 under the control made by the control portion 51. As shown in FIG. 5, the control portion 51 has a power source 71 and a connection selecting portion 72. The power source 71 is connected between the upper electrode 65 and the connection selecting portion 72, and supplies the voltage to be applied across the upper electrode 65 and one(s) of the lower electrodes 61 (corresponding one(s) of the lower electrodes 61 selected by the connection selecting portion 72). The connection selecting portion 72 is a switching processing portion for selecting corresponding one(s) of the lower electrodes 61 to be connected to the power source 71 (to the upper electrode 65 through the power source 71) from among the lower electrodes 61-1 to 61-4. In other words, the connection selecting portion 72 controls states of application of the voltages to the respective lower electrodes 61-1 to 61-4. It is noted that only a portion of the control portion 51 about the electrical connection between the upper electrode 65 and the lower electrodes 61 is shown in FIG. 5. Actually, however, the control portion 51 also has the structures other than the structure shown in FIG. 5, for example, the structures of the judging portion 53, the shape controlling portion 54, the position controlling portion 55, and the like shown in FIG. 4. In brief, the selection controlling portion 72, for example, selects one (s) of the lower electrodes 61 to be connected to the power source 71 in accordance with the control made by the judging portion 53, the shape controlling portion 54, the position controlling portion 55, and the like shown in FIG. 4.

In the manner as described above, in the liquid lens portion 56, the shape of the nonpolar liquid 63 is changed by applying the predetermined voltage (the voltage from the power source 71) across the upper electrode 65 and one(s) of the lower electrodes 61. The position of the nonpolar liquid 63 is changed by selecting one(s) of the lower electrodes 61 to which the voltage is to be applied. Thus, the emission direction of the passing light is controlled.

It is noted that FIG. 5 shows a state (OFF) in which the voltage is applied to none of the lower electrodes 61-1 to 61-4. That is to say, in this case, the connection selecting portion 72 connects the power source to none of the lower electrodes 61-1 to 61-4, and thus releases each of the lower electrodes 61-1 to 61-4 (cuts the connection).

In the state in which no voltage is applied across the electrodes in the manner as described above, it is important that the interface between the two layers of the nonpolar liquid 54 and the polar liquid 53 is horizontalized in FIG. 5 so as not to exert an influence on the optical path of the emitted light from the parallax image displaying portion 11. For example, this situation results from the shapes of the insulator 62 and the ribs 66, the magnitudes of the wettabilities with the polar liquid 64 and the nonpolar liquid 63, and the like. Therefore, the materials, the sizes, the shapes, and the like of the portions (especially, the insulator 62, the polar liquid 64, the nonpolar liquid 63, and the ribs 66) constituting the liquid lens portion 56 are determined by taking the situation as well that the interface between the two layers of the nonpolar liquid 63 and the polar liquid 64 is horizontalized in the state of no application of the voltage across the electrodes.

It is noted that the entire interface between the two layers of the nonpolar liquid 63 and the polar liquid 64 needs not to be necessarily horizontalized, and thus may be partially horizontalized depending on circumstances. For example, in such a case where a portion through which the emitted light from the parallax image displaying portion 11 mainly passes concentrates on a part of the interface between them, all that is required is that only that portion is horizontalized. Moreover, to add another word or two, the interface may be in any state (may have any shape) as long as it can be judged to be equal to the case where the entire interface between the two layers of the nonpolar liquid 63 and the polar liquid 64 is substantially horizontalized (the interface exerts no influence on the optical path).

Next, an example of lens movement control will now be described with reference to FIGS. 7 to 10.

Figure 7:
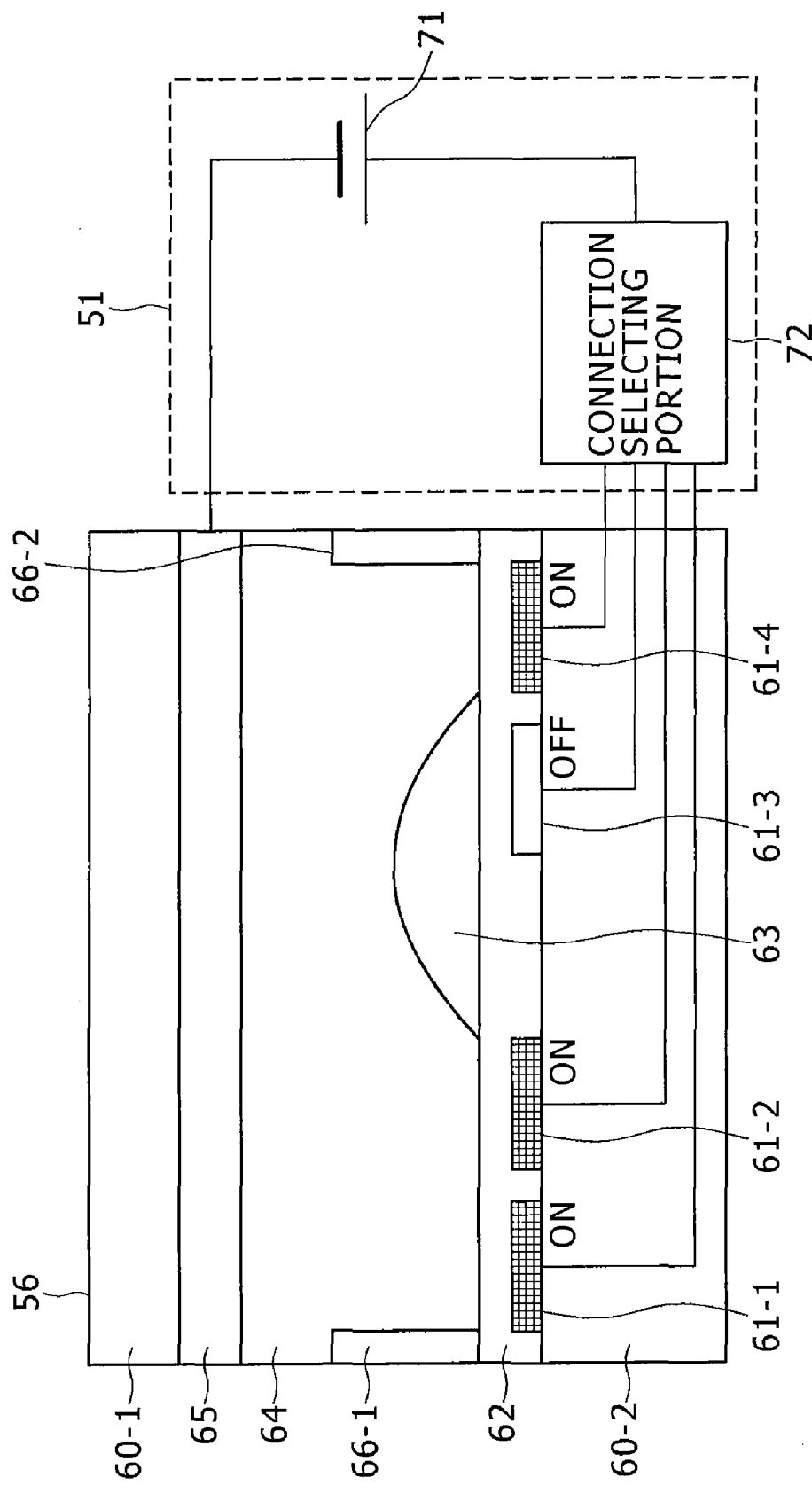
FIG. 7 is a view showing an example of movement of a nonpolar liquid.

FIG. 7 shows an example of the case where the nonpolar liquid 63 is moved to the right-hand side in the figure of the liquid lens portion 56. Referring to FIG. 7, the connection selecting portion 72 connects each of the lower electrodes 61-1, 61-2 and 61-4 to the power source 71, and thus each of the lower electrodes 61-1, 61-2 and 61-4 is held in an "ON" state. In a word, the voltage of the power source 71 is applied across each of the lower electrodes 61-1, 61-2 and 61-4, and the upper electrode 65. On the other hand, the connection selecting portion 72 does not connect the lower electrode 61-3 to the power source 71, and thus releases the lower electrode 61-3. That is to say, the lower electrode 61-3 is held in an "OFF" state, and no voltage of the power source 71 is applied across the lower electrode 61-3 and the upper electrode 65.

When the voltage of the power source 71 is applied across each of the lower electrodes 61-1, 61-2 and 61-4, and the upper electrode 65 in such a manner, polarized charges are generated in the insulator 62 in the vicinity of each of the lower electrodes 61-1, 61-2 and 61-4 in an electric field direction, and thus the charges are accumulated on the surface of the insulator 62 in the vicinity thereof (charge double layer state). Since the polar liquid 64 has the polarity, it is attempting to come near the insulator 62 in the vicinity of each of the lower electrodes 61-1, 61-2 and 61-4 due to the Coulomb force. That is to say, the polar liquid 64 approaches the vicinity of the insulator 62 in the vicinity of each of the lower electrodes 61-1, 61-2 and 61-4. On the other hand, since the nonpolar liquid 63 has no polarity, such a force is not generated. For this reason, the nonpolar liquid 63 in the vicinity of the insulator 62 in the vicinity of each of the lower electrodes 61-1, 61-2 and 61-4 is pushed aside by the polar liquid 64, and thus collects in the vicinity of the insulator 62 in the vicinity of the lower electrode 61-3 across the upper electrode 65 and which no voltage is applied to become a liquid droplet. As a result, the interface with the polar liquid 64 comes to have a lens shape.

At this time, the interface between the nonpolar liquid 63 and the polar liquid 64 deflects the optical path of the emitted light (the light passing through the liquid lens portion 56) from the parallax image displaying portion 11 due to the difference in refractive index between the two liquids, and the shape of the interface. As a result, as will be described later, the liquid lens portion 56 actually generates the parallaxes of the parallax image.

It is noted that a curvature of this interface is previously adjusted based on the refractive indexes of the nonpolar liquid 63 and the polar liquid 64 so that the refractive index of the passing light becomes optimal. That is to say, not only the materials, the sizes, the shapes, and the like of the portions constituting the liquid lens portion 56, but also the voltage to be applied across the electrodes are previously or suitably determined so that the refractive index of the passing light becomes optimal.

Figure 8:
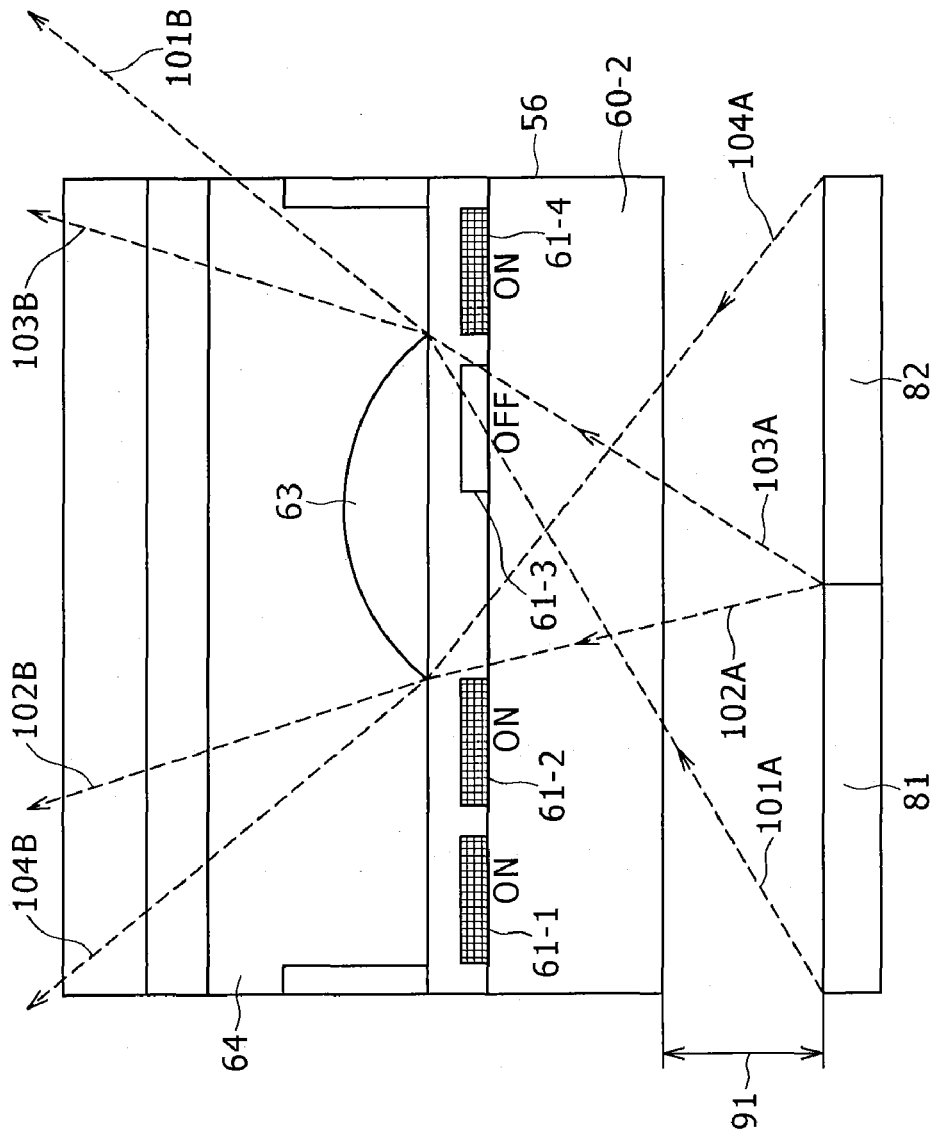
FIG. 8 is a view showing an example of optical paths in a state of FIG. 7.

FIG. 8 shows an example of the optical paths in the state of FIG. 7. In FIG. 8, the liquid lens portion 56 is disposed so that the emitted lights (visual information) from the luminescent pixel 81 and the luminescent pixel 82 of the parallax image displaying portion 11 are made incident to the liquid lens portion 56. At this time, the emitted lights (visual information) from the luminescent pixel 81 and the luminescent pixel 82 of the parallax image displaying portion II are light beams for stereo display (an image containing therein the parallax image), respectively. In addition, each of the luminescent pixel 81 and the luminescent pixel 82 is provided at a distance of a focal length (at a distance indicated by double sided arrows 91) in consideration of the lens characteristics of the nonpolar liquid 63.

The emitted lights from the luminescent pixel 81 and the luminescent pixel 82 (that is, the lights passing through the liquid lens portion 56) are deflected due to the shape of the interface between the nonpolar liquid 63 and the polar liquid 64 to be emitted from the liquid lens portion 56. For example, in the case of FIG. 8, a light 101A and a light 102A as the emitted lights from the luminescent pixel 81 are deflected in the interface between the nonpolar liquid 63 and the polar liquid 64 to be emitted in the form of a light 101B and a light 102B from the liquid lens portion 56, respectively. Likewise, for example, a light 103A and a light 104A as the emitted lights from the luminescent pixel 82 are deflected in the interface between the nonpolar liquid 63 and the polar liquid 64 to be emitted in the form of a light 103B and a light 104B from the liquid lens portion 56, respectively. Consequently, by disposing the liquid lens portion 56, the liquid lens portion 56 ideally can emit therefrom the passing light in the form of either a parallel light or a light near the parallel light.

Figure 9:
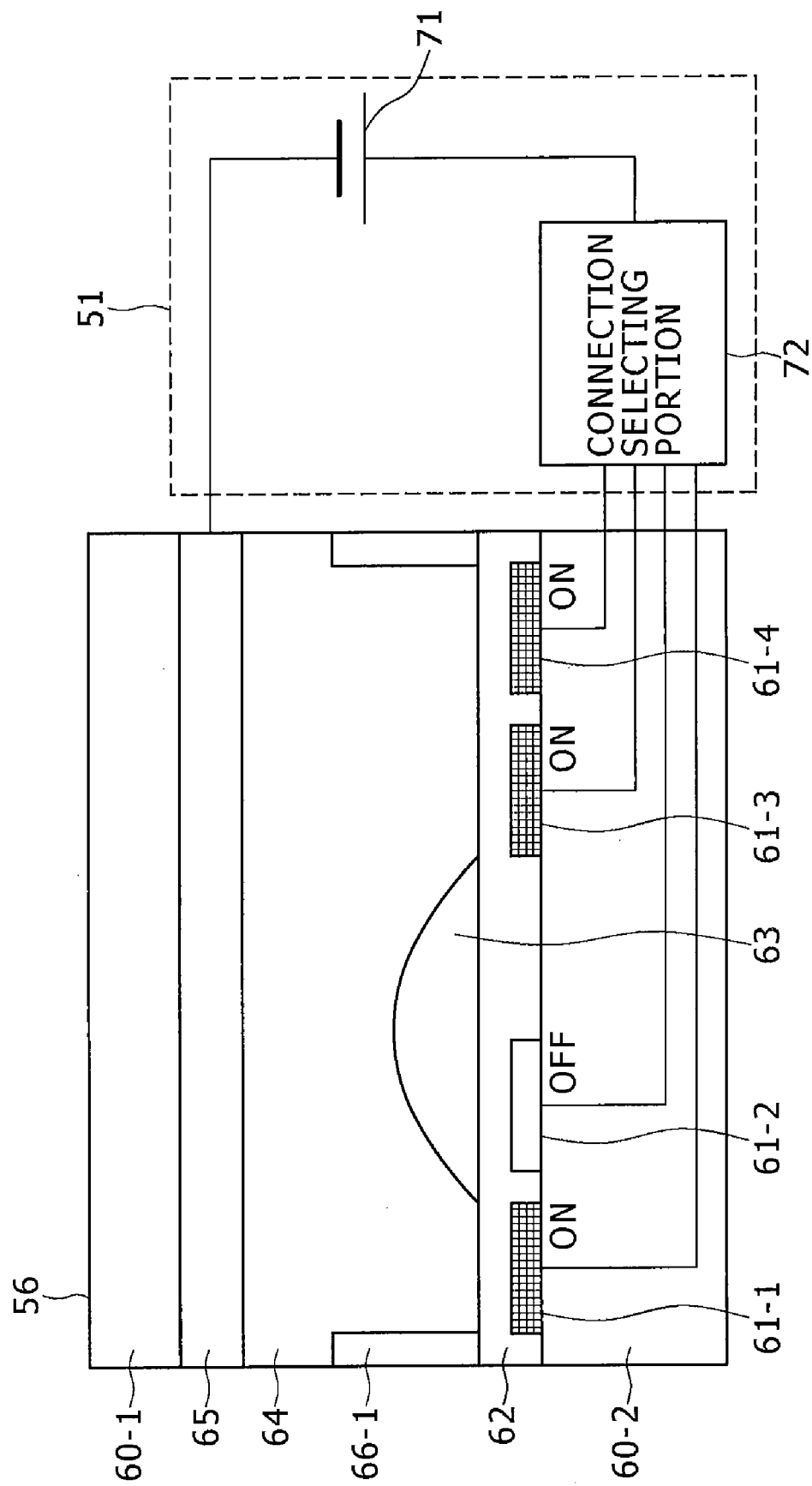
FIG. 9 is a view showing another example of movement of the nonpolar liquid.

FIG. 9 shows an example in the case where the nonpolar liquid 63 is moved to a left-hand side of the figure of the liquid lens portion 56 contrary to the case shown in FIG. 7. Referring to FIG. 9, the connection selecting portion 72 connects each of the lower electrodes 61-1, 61-3 and 61-4 to the power source 71, and thus each of the lower electrodes 61-1, 61-3 and 614 is held in the "ON" state. On the other hand, the connection selecting portion 72 does not connect the lower electrode 61-2 to the power source 71, and thus releases the lower electrode 61-2 ("the OFF state").

Similarly to the case of FIG. 7, the application of the voltage generates the Coulomb force for the polar liquid 64. For this reason, the nonpolar liquid 63 in the vicinity of the insulator 62 in the vicinity of each of the lower electrodes 61-1, 61-3 and 61-4 is pushed aside by the polar liquid 64, and thus collects in the vicinity of the insulator 62 in the vicinity of the lower electrode 61-2 across the upper electrode 65 and which no voltage is applied to become a liquid droplet. As a result, the interface with the polar liquid 64 comes to have a lens shape.

Figure 10:
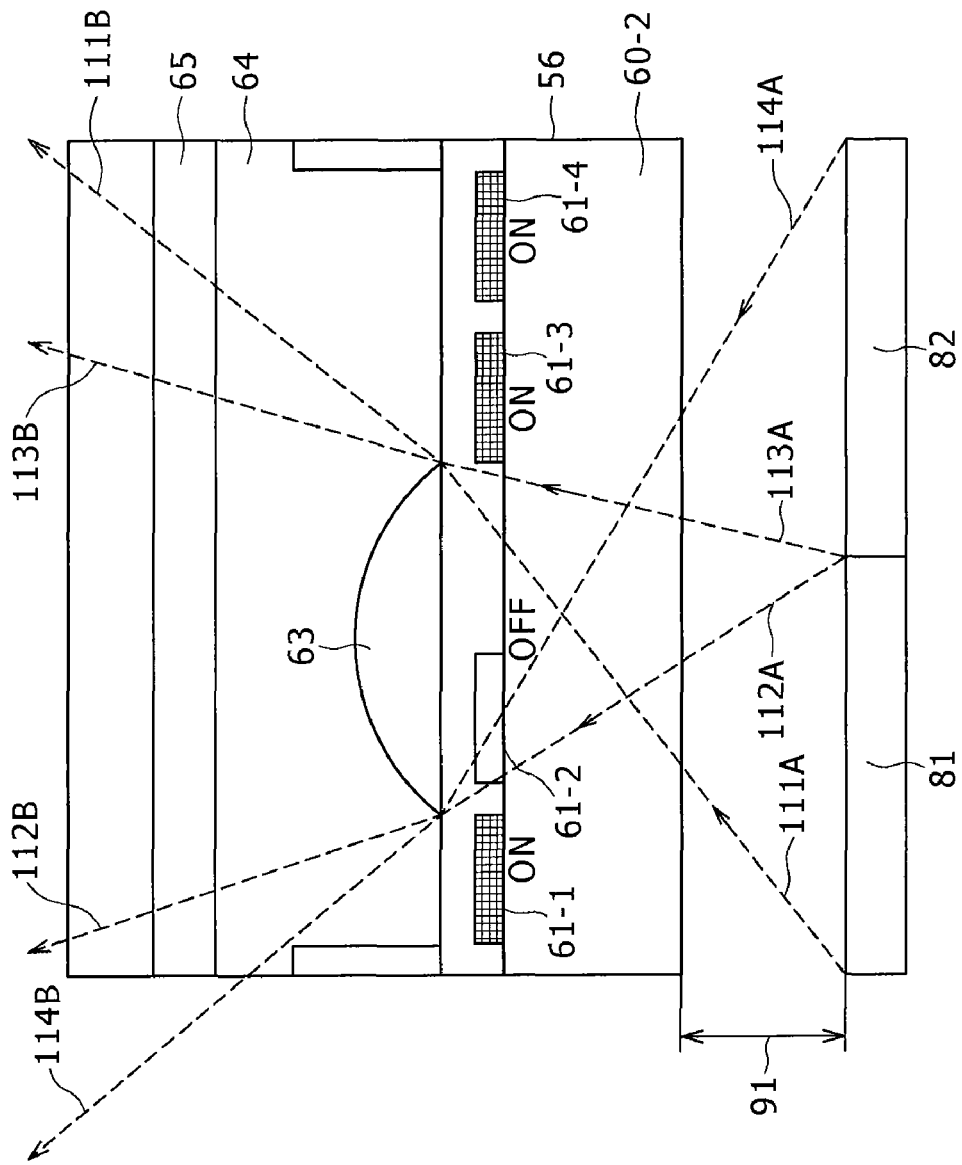
FIG. 10 is a view showing an example of optical paths in a state of FIG. 9.

Thus, as shown in FIG. 10, the emitted lights from the luminescent pixel 81 and the luminescent pixel 82 (that is, the lights passing through the liquid lens portion 56) are deflected due to the shape of the interface between the nonpolar liquid 63 and the polar liquid 64 to be emitted from the liquid lens portion 56 similarly to the case of FIG. 8. For example, in the case of FIG. 10, a light 111A and a light 112A as the emitted lights from the luminescent pixel 81 are deflected in the interface between the nonpolar liquid 63 and the polar liquid 64 to be emitted in the form of a light 111B and a light 112B from the liquid lens portion 56, respectively. Likewise, for example, a light 113A and a light 114A as the emitted lights from the luminescent pixel 82 are deflected in the interface between the nonpolar liquid 63 and the polar liquid 64 to be emitted in the form of a light 113B and a light 114B from the liquid lens portion 56, respectively.

The position of the nonpolar liquid 63 in the case of FIG. 10 is different from that in the case of FIG. 8. Thus, the emission directions of the lights passing through the liquid lens portion 56 in the case of FIG. 10 (traveling directions of the lights 111B to 114B in FIG. 10) are different from those of the lights passing through the liquid lens portion 56 in the case of FIG. 8 (traveling directions of the lights 101B to 104B in FIG. 8). That is to say, the position controlling portion 55 of the control portion 51 controls the connection selecting portion 72 to select one(s) of the lower electrodes 61 across the upper electrode 65 and which the voltage is to be applied as shown in FIG. 7 (FIG. 8) and FIG. 9 (FIG. 10), thereby making it possible to control the position of the nonpolar liquid 63. That is to say, the position controlling portion 55, for example, switches one(s) of the lower electrodes 61 across the upper electrode 65 and which the voltage is to be applied synchronously with an integral multiple of a synchronous signal for the displayed parallax image, thereby enabling the position of the nonpolar liquid 63 to be changed. By carrying out such an operation, the emission directions of the emitted lights from the liquid lens portion 56 change. In brief, the liquid lens portion 56 can emit therefrom the light emitted from one luminescent pixel in a plurality of directions. In other words, the parallax generating portion 12 can increase the number of parallaxes generated by each of the liquid lens portions 56, and thus can increase the number of parallaxes of the parallax image displayed in the parallax image displaying portion 11.

It is noted that although the connection selecting portion 72 selects one(s) of the lower electrodes 61 which is (are) to be held in the "ON" in FIG. 7 or FIG. 9, the selection is made in accordance with the results of the control made by both the shape controlling portion 54 and the position controlling portion 55 of the control portion 51.

For example, when the shape controlling portion 54 controls the connection selecting portion 72 so that the shape of the nonpolar liquid 53 becomes the lens-like shape (a state allowing the parallaxes to be generated), the connection selecting portion 72 applies the voltage to the selected one(s) of the lower electrodes 61 as shown in FIG. 7 as an initial state. Moreover, when the position controlling portion 55 controls the connection selecting portion 72 so as to change the position of the nonpolar liquid 53, the connection selecting portion 72 switches the selected one(s) of the lower electrode 61 which is (are) to be held in the "ON" state to provide the state shown in FIG. 9. After that time, the connection selecting portion 72 repeatedly switches the connection for tile lower electrodes 61 to repeat the state shown in FIG. 7 and the state shown in FIG. 9 in accordance with the control made by the position controlling portion 55, thereby changing the position of the nonpolar liquid 53. Also, when the position change is intended to be completed, the position controlling portion 55 controls the connection selecting portion 72 so as to complete the switching of the connection. When the parallax generation is intended to be completed, the shape controlling portion 54 controls the connection selecting portion 72, thereby causing all the lower electrodes 61 to be held in the "OFF" state.

By carrying out such an operation, the parallax generating portion 12 can perform not only the control for the position of the nonpolar liquid 63, but also the control for the shape of the nonpolar liquid 63. In a word, in this case, the parallax generating portion 12 can control not only the increase and decrease in number of parallaxes, but also the presence and absence of generation of the parallaxes.

It is noted that the initial state of the pattern of application of the voltage to the selected one(s) of the lower electrodes 61 described above may be not only the pattern of FIG. 7, but also any other pattern other than the pattern of FIG. 7, and thus, for example, may also be the pattern shown in FIG. 9.

By switching the position of the nonpolar liquid 63 in the manner as described above, the parallax generating portion 12 can generate the parallaxes of the parallax image displayed on the parallax image displaying portion 11. However, there is the possibility that actually, the emission directions overlap one another as shown in FIG. 1 even when the position of the nonpolar liquid 63 is simply changed.

Figure 11:
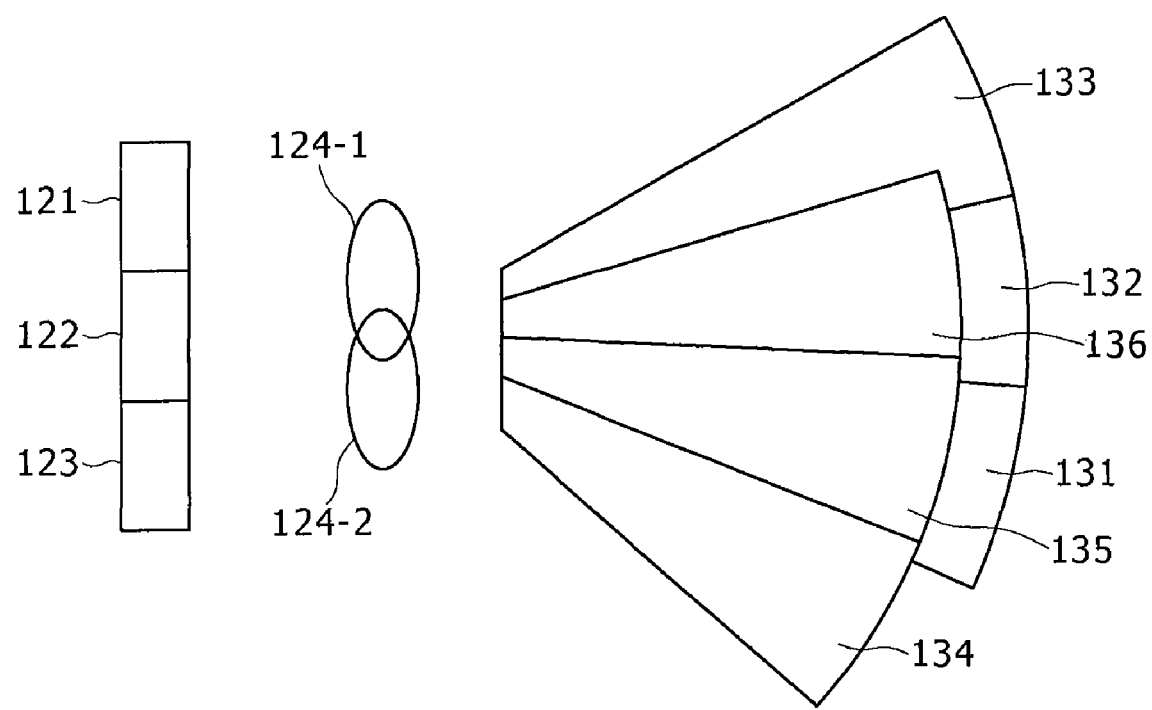
FIG. 11 is a schematic view showing an example of a situation of generation of parallaxes when none of emission directions is controlled.

FIG. 11 is a schematic view showing an example of a situation of generation of the parallaxes when none of the emission directions is controlled.

In FIG. 11, luminescent pixels 121 to 123 show examples of the luminescent pixels of the parallax image displaying portion 11. A liquid lenses 124-1 and 124-2 show an example of a situation of the position change of the nonpolar liquid 63 of the liquid lens portion 56 in the parallax generating portion 12. Also, light beams 131 to 136 show examples of emitted lights, from the luminescent pixels 121 to 123, which are emitted from the liquid lenses 124-1 and 124-2.

That is to say, the light beam 131 shows a light which is emitted from the luminescent pixel 121 and passes through the liquid lens 124-1 (the nonpolar liquid 63 controlled so as to be moved to a position represented by the liquid lens 124-1). Likewise, the light beam 132 shows a light which is emitted from the luminescent pixel 122 and passes through the liquid lens 124-1, and the light beam 133 shows a light which is emitted from the luminescent pixel 123 and passes through the liquid lens 124-1. On the other hand, the light beam 134 shows a light which is emitted from the luminescent pixel 121 and passes through the light lens 124-2 (the nonpolar liquid 63 controlled so as to be moved to a position represented by the liquid lens 124-2). Likewise, the light beam 135 shows a light which is emitted from the luminescent pixel 122 and passes through the liquid lens 124-2, and the light beam 136 shows a light which is emitted from the luminescent pixel 123 and passes through the liquid lens 124-2.

Even when the position of the nonpolar liquid 63 of the liquid lens portion 56 is changed as in the liquid lenses 124-1 and 124-2, the light beam directions of the emitted lights overlap those before the position change as shown in FIG. 11 in some cases. In a word, although central axes of the emitted lights can be switched, the entire emitted lights overlap those before the position change. When the user views the parallax image from a direction along which a plurality of emitted lights overlap one another in such a manner, there is the possibility that the parallax image looks as if a plurality of images overlap one another, the image which should be a still image looks like a moving image, the image looks like the flickering image, or the image looks as if its color or shape changes. That is to say, in such cases, there is the possibility that the image which is essentially intended to be viewed cannot be properly viewed depending on the position where the user views the parallax image.

Figure 12:
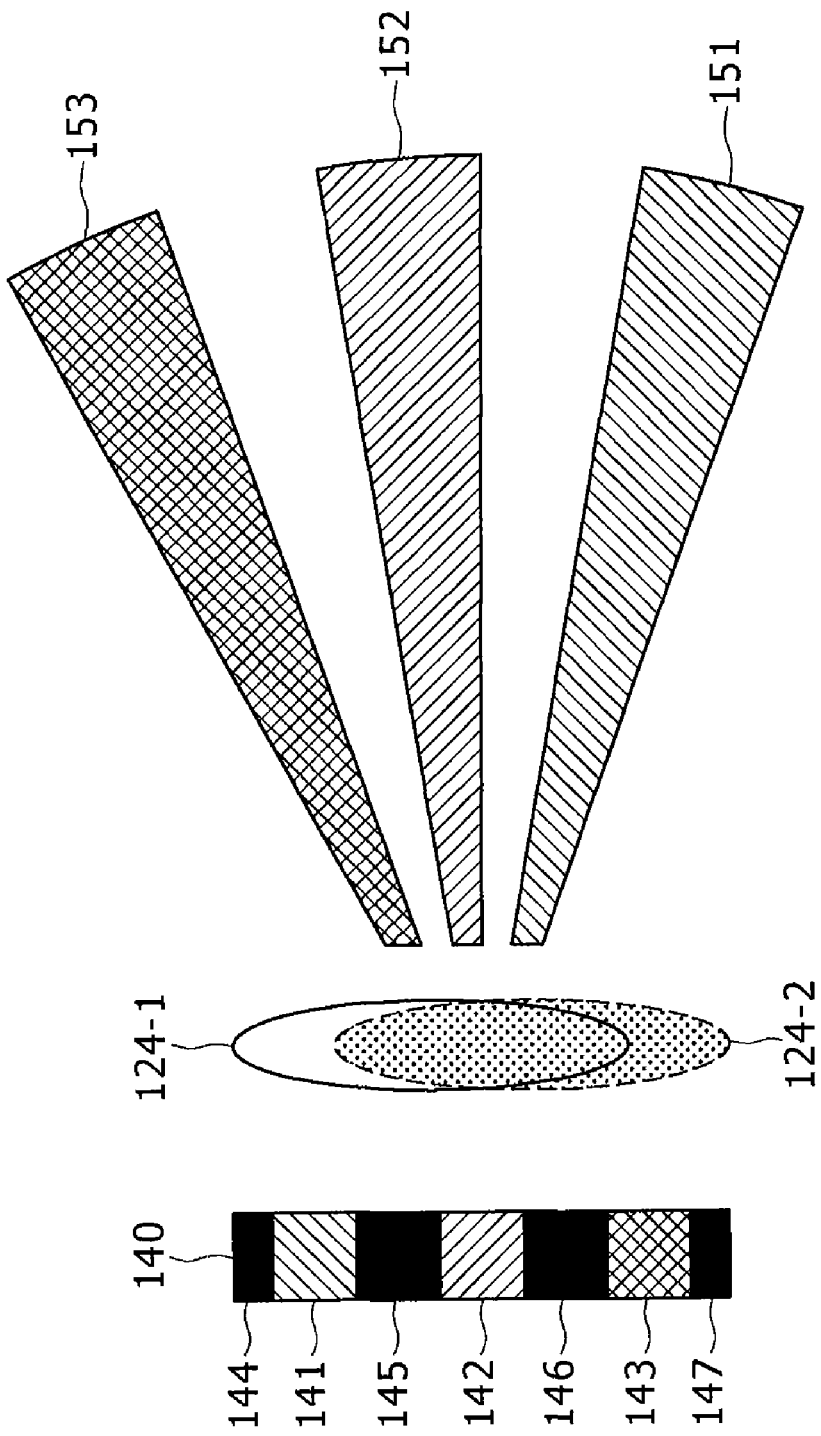
FIG. 12 is a schematic view showing an example of emission directions of light beams from liquid lens portions.
Figure 13:
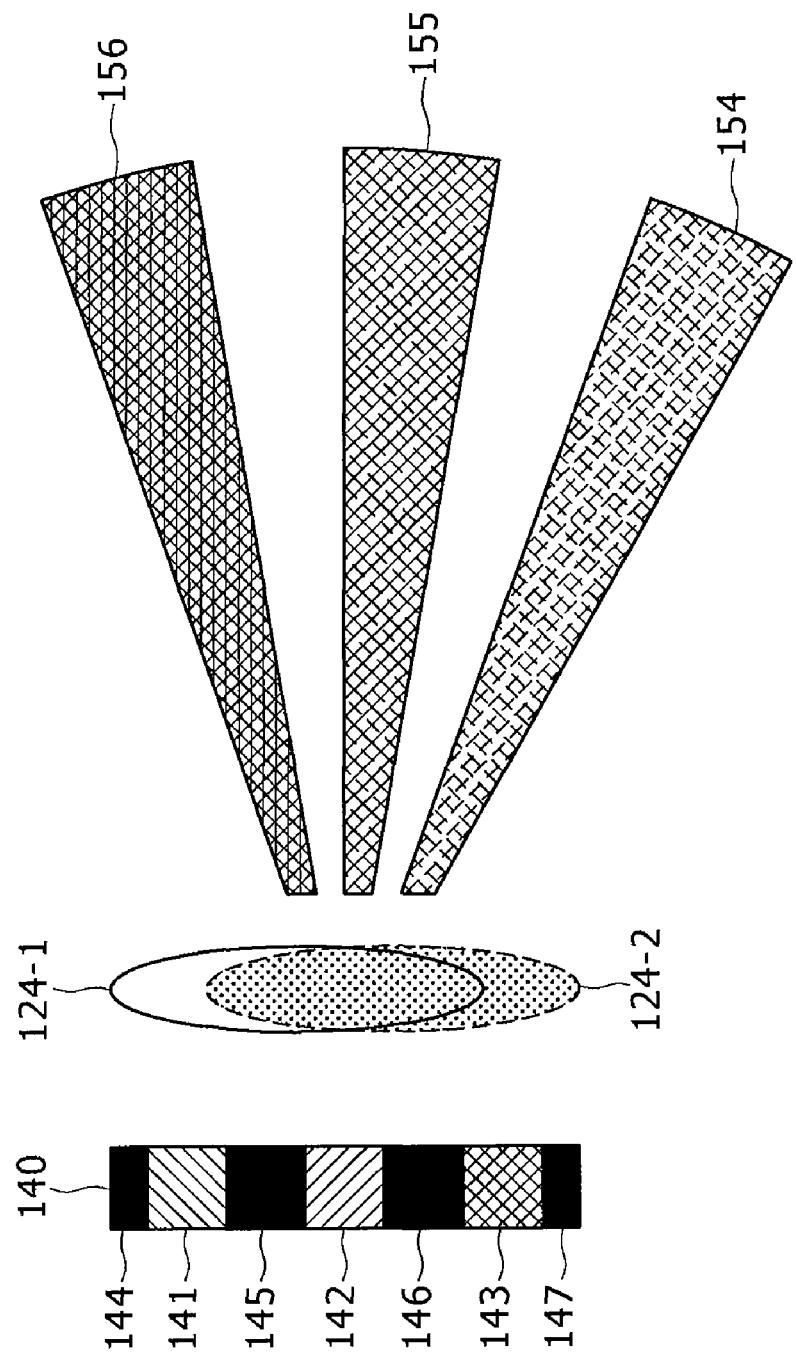
FIG. 13 is a schematic view showing an example of emission directions of light beams from a liquid lens portions.

Thus, as shown in FIGS. 12 and 13, any of the light beams is set so as not to exist in the initial state (in the state before the light beam directions are shifted) in the directions to which the light beam directions are intended to be shifted by moving the lenses. Hereinafter, examples of a situation of the control for the emission directions will be described with reference to FIGS. 12 to 14.

FIG. 12 is a schematic view showing an example of the emission directions of the light beams when the position (the position able to be represented by the liquid lens 124-1) of the nonpolar liquid 63 of the liquid lens portion 56 is located on one side. In the case of FIG. 12, the display portion 22 of the parallax image displaying portion 11 has the structure as shown in either of FIG. 2 and FIG. 3, and its emitted lights are emitted separately from one another at the predetermined intervals for the luminescent pixels. A light source 140 shows such a state, and thus three luminescent pixels (luminescent pixels 141 to 143) are separated from one another by spacers 144 to 147 having predetermined sizes, respectively. For example, when the display portion 22 of the parallax image displaying portion 11 has the pin hole filter 35 as shown in FIG. 3B, the luminescent pixels 141 to 143 represent the lights which are emitted through the pin holes (opening portions) of the pin hole filter 35, respectively.

In FIG. 12, the nonpolar liquid 63 of the liquid lens portion 56 is controlled to be located in a position which can be represented by the liquid lens 124-1. A light 151 represents a traveling direction of a light which is emitted from the luminescent pixel 141 and passes through the liquid lens 124-1. Likewise, a light 152 represents a traveling direction of a light which is emitted from the luminescent pixel 142 and passes through the liquid lens 124-1, and a light 153 represents a traveling direction of a light which is emitted from the luminescent pixel 143 and passes through the liquid lens 124-1.

Since the luminescent pixels 141 to 143 are separated from one another by the spacers 144 to 147 as shown in FIG. 12, the lights 151 to 153 are separated from one another, so that gaps (directions which none of the lights 151 to 153 reaches) are generated among them.

FIG. 13 is a schematic view showing an example of the emission directions of the light beams when the position (the position able to be represented by the liquid lens 124-2) of the nonpolar liquid 63 of the liquid lens portion 56 is located on the other side. A light 154 represents a traveling direction of a light which is emitted from the luminescent pixel 141 and passes through the liquid lens 124-2. Likewise, a light 155 represents a traveling direction of a light which is emitted from the luminescent pixel 142 and passes through the liquid lens 124-2, and a light 156 represents a traveling direction of a light which is emitted from the luminescent pixel 143 and passes through the liquid lens 124-2.

In the case as well of FIG. 13, since the lights 154 to 156 are represented from one another similarly to the case of FIG. 12, so that gaps (directions which none of the lights 154 to 156 reaches) are generated among them.

In such a case, the size of each of the spacers is made equal to that of each of the luminescent pixels. In a word, a rate of the luminescent pixels occupying in area the emission surface of the lights from the light source 140 is set as half. For example, when the display portion 22 has the pin hole filter 35 as shown in FIG. 3B, an aperture ratio of the pin hole 36 (a ratio of an area of the portions through which the lights are emitted, respectively, to an area of the entire display surface of the parallax image) is set as half. That is to say, for example, when the light emitting element portions of the luminescent pixels of the display portion 22 are arranged in array without any of gaps, the area of the pin holes 36 corresponding to the luminescent pixels, respectively, is reduced to half that of the light emitting element portions.

By adopting such a process, a rate of the area of the light emitting portions in the light source 140 when viewed from the liquid lens 124-1 becomes half. That is to say, a rate of the area of the lights 151 to 153 (the lights 154 to 156) occupying the area of the entire range in the emission directions of the lights from the liquid lens 124-1 (the liquid lens 124-2) to the area of the entire light source 140 is reduced to half. In other words, the size of the ranges of the lights 151 to 153, and the size of the range of the entire gap among them become equal to each other. At the same time, the size of the ranges of the lights 154 to 156, and the size of the range of the entire gap among them also become equal to each other.

Figure 14:
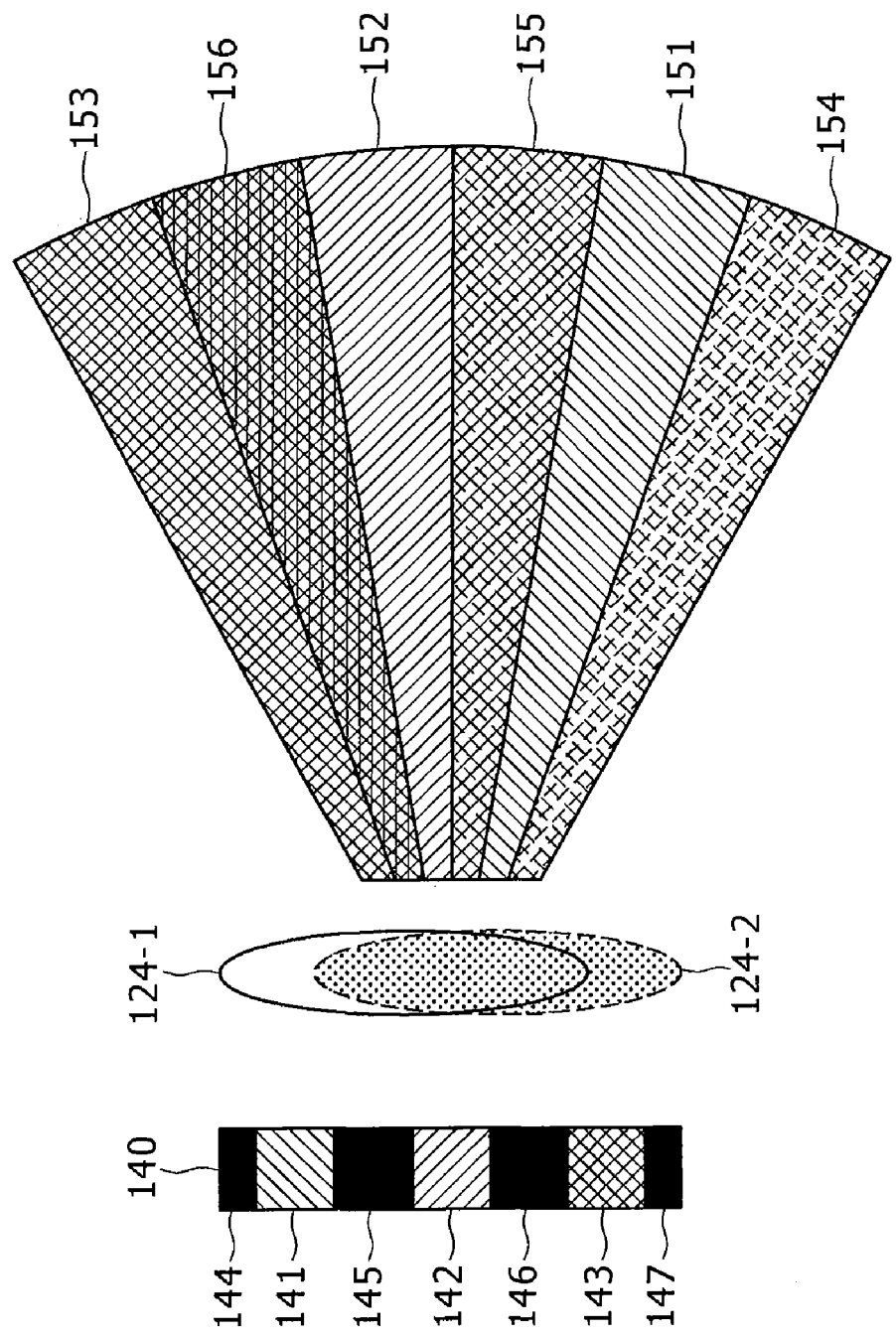
FIG. 14 is a schematic view showing an example of emission directions of light beams from the liquid lens portions.

The two states as shown in FIGS. 12 and 13 are optimally combined with each other, that is, a difference in position between the liquid lenses 124-1 and 124-2 (briefly, an amount of positional change of the nonpolar liquid 63) is optimized through adjustment, which results in that as shown in FIG. 14, the lights after the movement of the lens can be fitted to the respective spaces among the lights in the initial state without any of the gaps. In a word, in the case of FIG. 14, none of the lights 151 to 156 overlaps any of other lights, and also generates a gap with any of other lights.

By adopting such a structure, the user who views the parallax image can properly view the image corresponding to the his/her viewing position without feeling a sense of incompatibility such as the flickering or the overlapping.

That is to say, the parallax image displaying device 1 can increase the number of parallaxes per lens without reducing the resolution of the image by changing the position of the lens, and moreover can suppress the reduction of the image quality by adjusting the aperture ratio of the light source, and the amount of change of the lens position.

It is noted that although the description has been given so far with respect to the case where the display portion 22 includes the pin hole filter 35, of course, the display portion 22 may also adopt any of other structures as have been described above with reference to FIGS. 2 and 3.

In addition, although the description has been given so far with respect to the case where the nonpolar liquid 63 is moved between the two positions, the number of positions of the nonpolar liquid 63 (the number of positions which the position controlling portion 55 controls) may be three or more as will be described later. Note that, in order to prevent the traveling directions of the lights emitted from the liquid lens portion 56 from overlapping one another as shown in FIG. 14, and also to prevent the gaps from being generated among them, when the number of positions which the position controlling portion 55 controls is N (N is an integral number, and N≧2), the aperture ratio of the light source 140 shown in FIGS. 12 to 14 needs to be set at 1/N.

Next, a description will now be given with respect to an amount of movement of the nonpolar liquid 63 for carrying out the control for the directions of the lights as shown in FIG. 14.

When it is assumed that the light beams passed through the respective lenses are the parallel lights because the lenses are placed in the positions which are at distances of their focal lengths (although being different from the actual case in a precise sense), respectively, gradients of ends of fluxes of the lights, corresponding to the respective pixels, emitted through the respective lenses are approximately equal to those of straight lines which pass through centers of the respective lenses from the both ends of the respective pixels.

Gradients of the respective straight lines at the both ends of the lights 151 to 156 shown in FIG. 14 will be shown hereinafter. Note, an upper side end of each of the light beams is designated with H, and a lower side end thereof is designated with L. In addition, the size of each of the luminescent pixels (the longitudinal length in FIG. 14 of each of the luminescent pixels 141 to 143 in the figure) is designated with A, a gap defined between each of the liquid lenses 124-1 and 124-2 (the nonpolar liquid 63), and the light source is designated with X, and each of amounts of movement of the liquid lenses 124-1 and 124-2 (a difference in position between the liquid lenses 124-1 and 124-2) is designated with Y.

153H: $\{(7/2)A+(1/2)Y\}/X$
153L: $\{(5/2)A+(1/2)Y\}/X$
156H: $\{(7/2)A-(1/2)Y\}/X$
156L: $\{(5/2)A-(1/2)Y\}/X$
152H: $\{(1/2)A+(1/2)Y\}/X$
152L: $\{-(1/2)A+(1/2)Y\}/X$
155H: $\{(1/2)A-(1/2)Y\}/X$
155L: $\{-(1/2)A-(1/2)Y\}/X$
151H: $\{-(5/2)A+(1/2)Y\}/X$
151L: $\{-(7/2)A+(1/2)Y\}/X$
154H: $\{-(5/2)A-(1/2)Y\}/X$
154L: $\{-(7/2)A-(1/2)Y\}/X$

Figure 15:
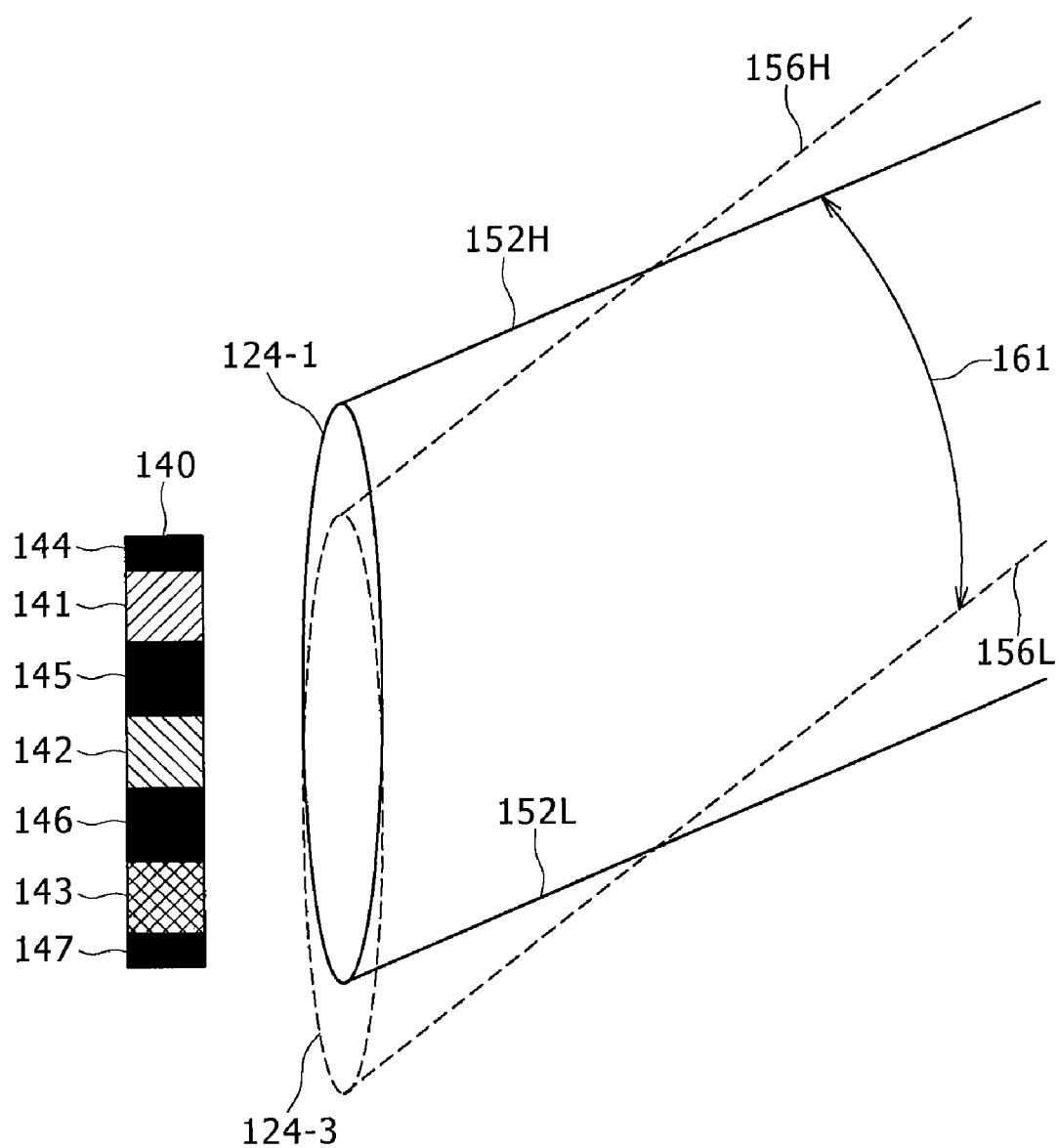
FIG. 15 is a view showing a positional relationship between two lights of FIG. 14.

Here, for example, attention is paid to a positional relationship between the light 156 and the light 152. FIG. 15 shows this positional relationship between the light 156 and the light 152. In FIG. 15, a dotted line 156H and a dotted line 156L represent an upper end and a lower end of the light 156, respectively, and a solid line 152H and a solid line 152L represent an upper end and a lower end of the light 152, respectively.

As shown in FIG. 1S, the overlapping between the two regions of the light 156 and the light 152 depends on a relationship between the dotted line 156L and the solid line 152H. That is to say, the dotted line 156L and the solid line 152H also represent a lower end and an upper end of a region in which the light 156 and the light 152 overlap each other. Therefore, in order to prevent the light 156 and the light 152 from overlapping each other as much as possible, it is required that the dotted line 156L and the solid line 152H are made parallel to each other (close to each other) as much as possible.

Since the luminescent pixel size A is a constant, and the distance between each of the lenses and the corresponding one of the luminescent pixels is also a constant, an amount, y, of lens movement determines the gradients of the dotted line 156L and the solid line 152H. That is to say, the degree of the overlapping necessarily depends on the amount, Y, of lens movement.

Figure 16A:
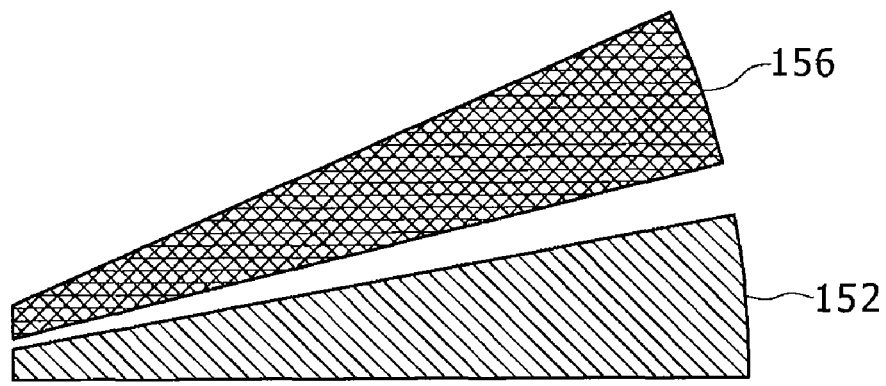
FIGS. 16A to 16C are views showing a relationship between a movement amount, Y, of lens and traveling directions of lights.

FIG. 16 shows a relationship between the lens movement amount Y and each of the traveling directions of the light 156 and the light 152. FIG. 16A shows situations of tile light 156 and the light 152 when a value of the lens movement amount Y is larger than the luminescent pixel size A (Y>A). In this case, since the region of the light 156, and the region of the light 152 are separated from each other, a portion is generated in which no light reaches. Therefore, in this case, the pixel positions become nonuniform in the image which the user views depending on the position where the parallax image is viewed. As a result, there is the possibility that the unevenness is generated, for example, an unnecessary dark portion is generated. In a word, in this case, the image quality of the image which the user views is reduced.

Figure 16B:
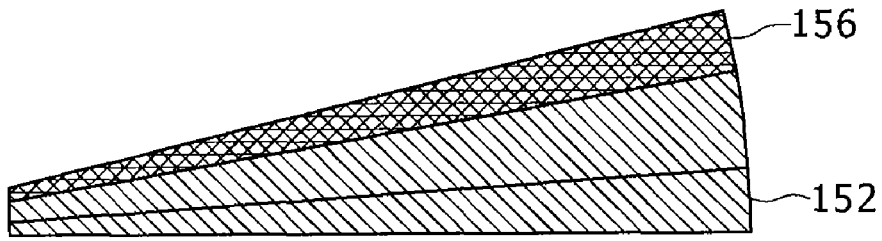

Contrary to the case of FIG. 16A, FIG. 16B shows situations of the light 156 and the light 152 when the value of the lens movement amount Y is smaller than the luminescent pixel size A (Y<A). In this case, the region of the light 156, and the region of the light 152 largely overlap each other. In addition, since the dotted line 156L and solid line 152H described above are not parallel to each other, an area of the overlapping region increases as each of the light 156 and the light 152 travels further away from the parallel generating portion 12. In a word, in this case as well, the unevenness is generated in the image which the user views depending on the position where the parallax image is viewed. As a result, there is the possibility that the unnecessary phenomenon such as the deformation or the discoloration occurs. That is to say, in this case as well, the image quality of the image which the user views is reduced.

Figure 16C:
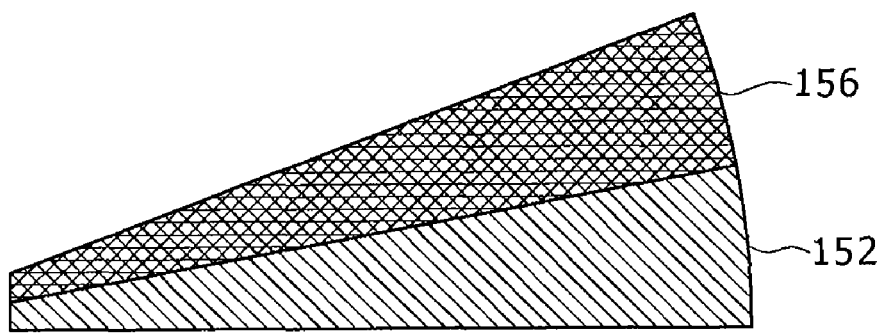

FIG. 16C shows situations of the light 156 and the light 152 when the value of the lens movement amount Y is equal to the luminescent pixel size A (Y=A). In this case, the dotted line 156L and the solid line 152H become parallel to each other as much as possible, so that the size of the region in which the light 156 and the light 152 overlap each other becomes minimum. That is to say, the lens movement amount Y is equalized to the luminescent pixel size A, thereby making it possible to suppress the reduction of the image quality due to the overlapping of the lights, or the like to the minimum. The size of the overlapping portion in this case is an amount which is obtained by subtracting the movement amount Y from the lens diameter, and is about 300 µm or less in the normal case. As a result, it is approximately impossible for the user to confirm the overlapping even when viewing the image.

In a word, the parallax image displaying device 1 of FIG. 1 to which the present invention is applied can generate more parallaxes without reducing the resolution and the image quality.

It is noted that such a liquid lens portion 56, for example, can be manufactured as follows. For the lower electrodes 61, for example, an ITO film is deposited on a substrate made of a glass by utilizing a predetermined method, thereby forming electrodes. The upper electrode 65 is similarly formed. The insulator 62 is deposited on the substrate having the lower electrodes 61 formed thereon by utilizing a spin coat method, a dip coat method or the like. For example, in depositing the film from a 3% liquid solution of Teflon (registered trademark) (E. I. du Pont de Nemours and Company) 1601s by utilizing the spin coat method, a thickness of the film becomes about 0.5 µm under conditions of 1500 rpm and 60 sec. A thickness of submicron to several microns can be controlled under conditions of a liquid solution concentration of 1% to 6%, and a spin coat rotating speed of 1500 rpm to 5000 rpm.

Moreover, the net-like rib 66 is formed on the insulator 62. A rib pixel size in this case is determined depending on the matching with the display pixels. For example, the net-like rib 66 can be made by utilizing a predetermined photolithography technique or the like using a resist made of an epoxy resin. When a fluoride compound system material is used as the material for the insulator 62, the resist is shed from a relationship of the wettability. However, this problem can be avoided by devising the manufacturing process. For example, in the case where a SU-8 3050 resist made by Kayaku MicroChem Co., Ltd. is applied to Teflon (registered trademark) by using a blade, the resist is shed when the normal process after application is carried out. However, a soft baking process is carried out at a low temperature (50° C.) for a long time, or the natural drying is carried out at a room temperature, thereby making it possible to coat Teflon (registered trademark) with the resist. Although the setting of the height of the blade results in that the height of the rib 66 can be controlled up to a range of several microns to several hundreds of microns, the lower one is desired from a viewpoint of an operating speed of two liquid droplets.

After that time, a gap forming material is disseminated in a peripheral portion of the lower electrodes so that an interelectrode distance between each of the lower electrodes 61, and the upper electrode 65 gets a predetermined value. For example, a material obtained by mixing an adhesive agent with silicon spheres, a seal adhesive agent type material or the like can be given as the gap forming material.

Thereafter, the nonpolar liquid 63 and the polar liquid 64 are injected in this order into a rib pixel. At this time, the shape in which the nonpolar liquid 63 exists on the lower side and the polar liquid 64 exists on the upper side becomes stable irrespective of relative densities of the polar liquid 64 and the nonpolar liquid 63 from a relationship of the wettability. In addition, at this time, a change in hydrophilic nature of the rib 66 due to ultraviolet irradiation enables the shape of the two liquids in a steady state to be changed. For example, with a method in which when a liquid 1 is used in water and a liquid 2 is used in dodecane under the conditions of the rib size of 0.6 mm×0.6 mm, and the height of 50 µm using the SU-8 resist made by Kayaku MicroChem Co., Ltd., after dodecane is injected to cover all over the rib, a lot of water is inpoured from the upper side thereinto, and the resulting object is sealed with an epoxy adhesive agent, a diameter of dodecane became 400 µm under the condition that the ultraviolet irradiation was performed for 10 minutes, while the diameter of dodecane became 250 µm under the condition that the ultraviolet irradiation was performed for 30 minutes. It is thought that this difference is due to a difference in the strength of the hydrophilic nature of the rib 66 caused by a difference in the irradiation period of time.

After that, the upper substrate and the lower substrate having the gap forming material disseminated therein are stuck to each other to obtain a panel, and a periphery of the resulting panel is sealed with a sealing resin. Ionomer, adhesive polyethylene or the like can be used as the sealing resin. A light beam direction controlling element in which the liquid lens structures are two-dimensionally developed can be manufactured in the processes as described above.

Although the description has been given so far with respect to the case where the number of controlled positions of the nonpolar liquid 63 (the number of places where the nonpolar liquid 63 is moved) to two, the number of controlled positions of the nonpolar liquid 63 may be of course three or more.

A description will now be given with respect to the case where the number of controlled positions of the nonpolar liquid 63 is three with reference to FIGS. 17 to 21.

FIG. 17 is a schematic view showing a structural example of the liquid lens portion 56 in this case, and is a view corresponding to FIG. 5 in the case where the number of controlled positions is two. Although in the case as well of FIG. 17, the structure of the liquid lens portion 56 is basically the same as that in the case of FIG. 5, the number of lower electrodes 61 is different from that in the case of FIG. 5. In the case of FIG. 17, the liquid lens portion 56 has six lower electrodes (lower electrodes 61-1 to 61-6) disposed on a plane. Each of these lower electrodes 61-1 to 61-6 is connected to the connection selecting portion 72, and the connection selecting portion 72 switches the connection between corresponding ones of the lower electrodes 61-1 to 61-6, and the power source 71. That is to say, the voltage is applied across each of ones of the lower electrodes 61 selected from among the lower electrodes 61-1 to 61-6 by the connection selecting portion 72, and the upper electrode 65. It is noted that in FIG. 17, none of the lower electrodes 61-1 to 61-6 is connected to the power source 71, and all of them are held in the "OFF" state. At this time, for example, the interface between the nonpolar liquid 63 and the polar liquid 64 is horizontalized (in the longitudinal direction in the figure), and so forth, so that the nonpolar liquid 63 exerts no influence on any of the optical paths of the respective passing lights.

FIG. 18 is a view showing an example in the case where the nonpolar liquid 63 is located on the right-hand side in the figure in the liquid lens portion 56 of the example of FIG. 17. In FIG. 18, the connection selecting portion 72 selects the lower electrodes 61-1 to 61-3, and the lower electrode 61-6, and connects each of the lower electrodes thus selected to the power source 71, so that each of the lower electrodes 61-1 to 61-3, and the lower electrode 61-6 is held in an "ON" state. Thus, the polar liquid 64 collects over the vicinities of the lower electrodes 61-1 to 61-3, and the lower electrode 61-6. As a result, the nonpolar liquid 63 is located over the vicinities of the lower electrodes 61-4 and 61-5 (on the right-hand side in the figure of the liquid lens portion 65) each of which is held in an "OFF" state.

FIG. 19 is a view showing an example in the case where the nonpolar liquid 63 is located at the center in the figure in the liquid lens portion 56 of the example of FIG. 17. In FIG. 19, the connection selecting portion 72 selects the lower electrodes 61-1 and 61-2, and the lower electrodes 61-5 and 61-6, and connects each of the lower electrodes thus selected to the power source 71, so that each of the lower electrodes 61-1 and 61-2, and the lower electrodes 61-5 and 61-6 is held in the "ON" state. Thus, the polar liquid 64 collects over the vicinities of the lower electrodes 61-1 and 61-2, and the lower electrodes 61-5 and 61-6. As a result, the nonpolar liquid 63 is located over the vicinities of the lower electrodes 61-3 and 61-4 (on the right-hand side in the figure of the liquid lens portion 65) each of which is held in the "OFF" state.

FIG. 20 is a view showing an example in the case where the nonpolar liquid 63 is located on the left-hand side in the figure in the liquid lens portion 56 of the example of FIG. 7. In FIG. 20, the connection selecting portion 72 selects the lower electrode 61-1, and the lower electrodes 61-4 to 61-6, and connects each of the lower electrodes thus selected to the power source 71, so that each of the lower electrode 61-1, and the lower electrodes 61-4 to 61-6 is held in the "ON" state. Thus, the polar liquid 64 collects over the vicinities of the lower electrode 61-1, and the lower electrodes 61-4 to 61-6. As a result, the nonpolar liquid 63 is located over the vicinities of the lower electrodes 61-2 and 62-3 (on the left-hand side in the figure of the liquid lens portion 65) each of which is held in the "OFF" state.

Figure 21:
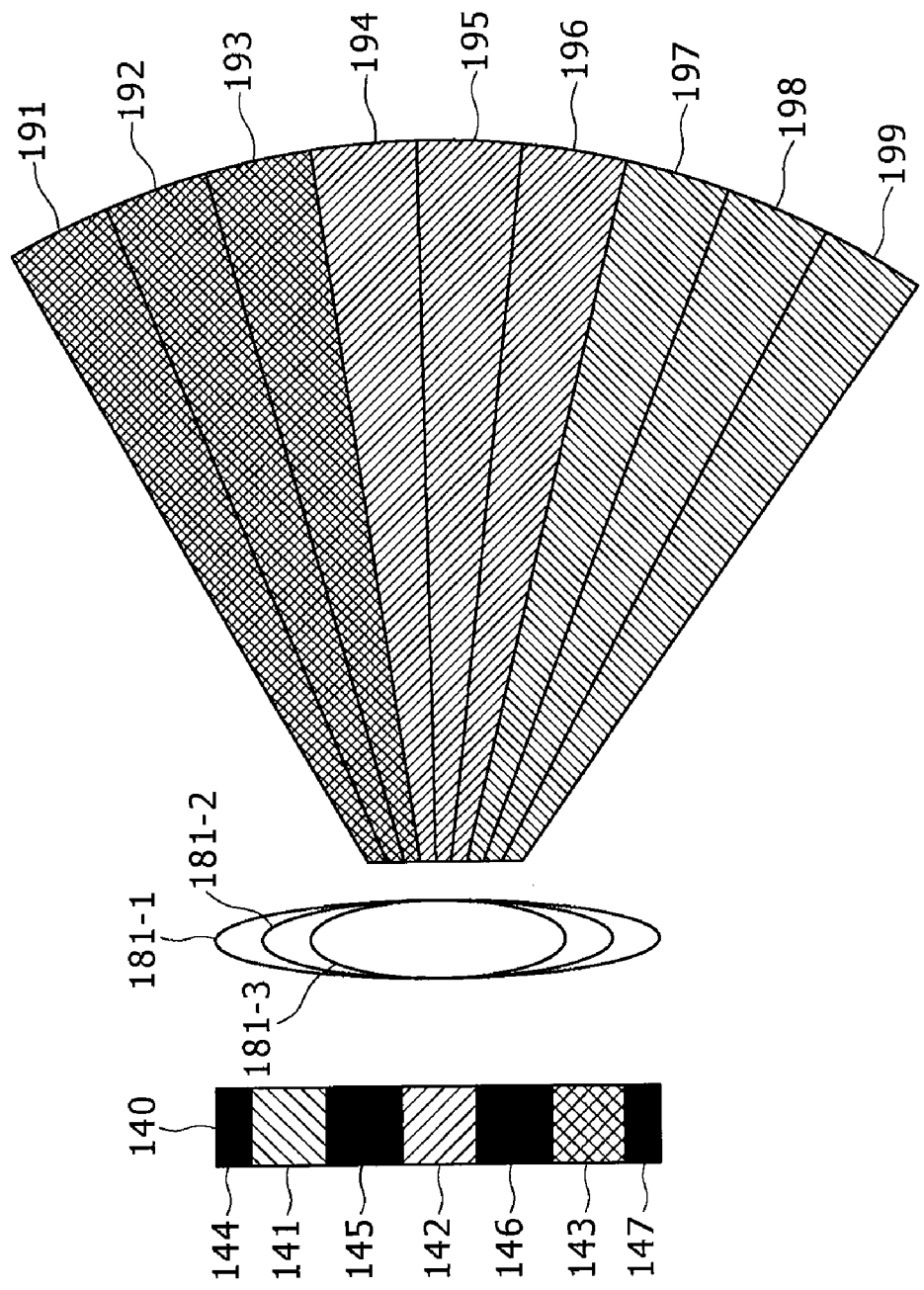
FIG. 21 is a view showing an example of a situation of control for emission directions in this case.

The liquid lens is controlled to be located in the three positions in the manner as described above, which results in that each of the emitted lights from the respective luminescent pixels of the display portion 22 is controlled so as to travel in the three directions different from one another as shown in FIG. 21.

FIG. 21 is a view showing an example of a situation of the emission direction control in this case.

Referring to FIG. 21, as shown in the form of liquid lenses 181-1 to 181-3, the nonpolar liquid 63 of the liquid lens portion 56 is controlled so as to be located in the three positions. Therefore, the three lights emitted from the luminescent pixels 181-1 to 181-3 of the light source 140, respectively, are emitted in nine directions different from one another as shown in the form of lights 191 to 199 through the liquid lenses 181-1 to 181-3.

In FIG. 21, the light 191 represents a light which is emitted from the luminescent pixel 143 and passes through the liquid lens 181-1, the light 192 represents a light which is emitted from the luminescent pixel 143 and passes through the liquid lens 181-2, and the light 193 represents a light which is emitted from the luminescent pixel 143 and passes through the liquid lens 181-3. In addition, the light 194 represents a light which is emitted from the luminescent pixel 142 and passes through the liquid lens 181-1, the light 195 represents a light which is emitted from the luminescent pixel 142 and passes through the liquid lens 181-2, and the light 196 represents a light which is emitted from the luminescent pixel 142 and passes through the liquid lens 181-3. Also, the light 197 represents a light which is emitted from the luminescent pixel 141 and passes through the liquid lens 181-1, the light 198 represents a light which is emitted from the luminescent pixel 141 and passes through the liquid lens 181-2, and the light 199 represents a light which is emitted from the luminescent pixel 141 and passes through the liquid lens 181-3.

At this time, the number of controlled positions of the nonpolar liquid 63 is three. From this reason, the aperture ratio of the light source 140 is set at third, and the distance (the amount of movement of the liquid lens) between each two adjacent positions with respect to the liquid lenses 181-1 to 181-3 is set so as to become equal to the size of each of the luminescent pixels. In addition, the distances between the light source 140, and the liquid lenses 181-1 to 181-3 are set to the focal lengths of the liquid lenses 181-1 to 181-3, respectively.

Hereinafter, gradients of respective straight lines at the both ends of the lights 191 to 199 are shown in FIG. 21. Note, an upper side end of each of the light beams is designated with H, and a lower side end thereof is designated with L. In addition, the size of each of the luminescent pixels is designated with A, the gap defined between each of the liquid lenses 181-1 to 181-3 (the nonpolar liquid 63), and the light source is designated with X, and the amount of movement about the liquid lenses 181-1 to 181-3 (the nonpolar liquid 63) (the difference between each two adjacent positions about the liquid lenses 181-1 to 181-3) is designated with Y.

191H: $\{(7/2)A+Y\}/X$
191L: $\{(5/2)A+Y\}/X$
192H: $\{(7/2)A\}/X$
192L: $\{(5/2)A\}/X$
193H: $\{(7/2)A-Y\}/X$
193L: $\{(5/2)A-Y\}/X$
194H: $\{(1/2)A+Y\}/X$
194L: $\{-(1/2)A+Y\}/X$
195H: $\{(1/2)A\}/X$
195L: $\{-(1/2)A\}/X$
196H: $\{(1/2)A-Y\}/X$
196L: $\{-(1/2)A-Y\}/X$
197H: $\{-(5/2)A+Y\}/X$
197L: $\{-(7/2)A+Y\}/X$
198H: $\{-(5/2)A\}/X$
198L: $\{-(7/2)A\}/X$
199H: $\{-(5/2)A-Y\}/X$
199L: $\{-(7/2)A-Y\}/X$

Therefore, the degree of the overlapping depends on the lens movement amount Y similarly to the case where the number of controlled positions is two. From this reason, the aperture ratio of the light source is set at third, and the lens movement amount Y is set as being equal to A (Y=A), which results in that in this case as well, the parallax generating portion 12 can suppress the deterioration of the image quality due to the overlapping of the lights to the minimum.

Increasing the number, N, of controlled positions of the nonpolar liquid 63 in each of the liquid lens portions 56 in the manner as described above results in that the parallax image displaying device 1 can further increase the number of parallaxes. Even in this case, the dispositional relationship among the individual portions, the lens movement amount, the aperture ratio of the light source, and the like are suitably set. As a result, the parallax image displaying device 1 can increase the number of parallaxes without reducing the resolution and the image quality.

It is noted that tile number of lower electrodes may be arbitrarily set or the numbers of lower electrodes may be different from one another among liquid lens portions 56 as long as the nonpolar liquid 63 in each of the liquid lens portion 56 can be moved to the predetermined controlled position. For example, in the example (in the case where the number of controlled positions is three) of FIG. 17, the number of lower electrodes 61 may be set to seven or more. In addition, sufficiently many lower electrodes 61 may be previously disposed, and the number of controlled positions may be changed depending on the situation. In addition, the sizes of the lower electrodes 61 may be different from one another, or the control portion 51 may apply simultaneously the voltages having the voltage values different from one another to the corresponding ones of the lower electrodes 61, respectively. Or, the voltage value of the voltage applied to one of the lower electrodes 61 may be continuously or discontinuously changed along a time base.

Moreover, the number of luminescent pixels corresponding to the liquid lens portions 56, respectively, that is, the number of luminescent pixels for emitting the lights which will pass through the liquid lens portions 56, respectively, may be set arbitrarily set, or the numbers of luminescent pixels may be different from one another among the liquid lens portions 56 as long as it allows the parallaxes of the parallax image to be generated.

Figure 22:
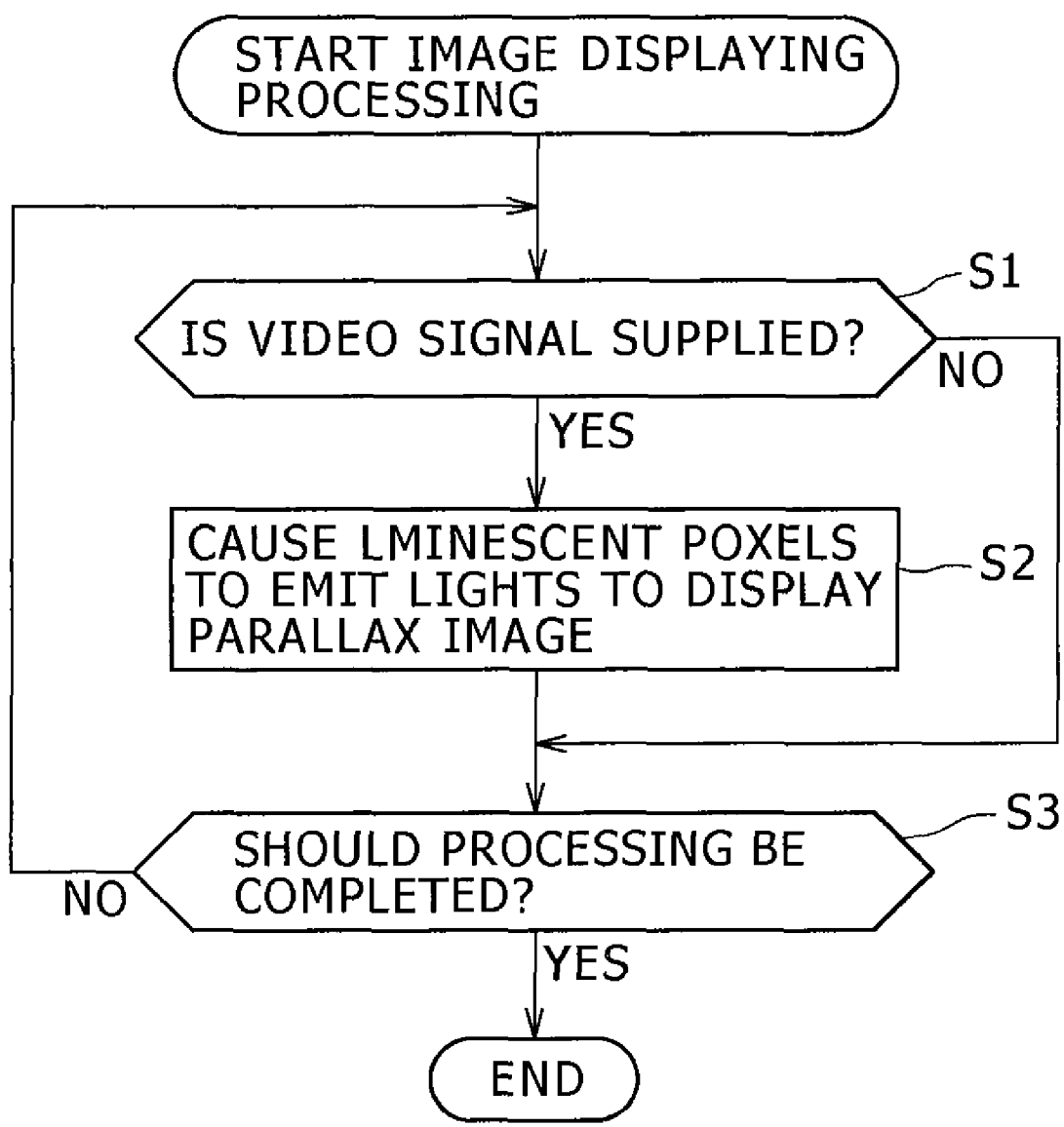
FIG. 22 is a flow chart explaining an example of a flow of image displaying processing.

Next, an example of a flow of image displaying processing executed by the display controlling portion 21 of the parallax image displaying portion 11 will now be described with reference to a flow chart of FIG. 22.

When the image displaying processing is started by, for example, activating the parallax image displaying device 1 of FIG. 1, in Step S1, the display controlling portion 21 of the parallax image displaying portion 11 judges whether or not a video signal about the parallax image is supplied from the outside. When judging that the video signal about the parallax image is supplied from the outside, the display controlling portion 21 causes the processing to proceed to Step S2 in which the luminescent pixels of the display portion 22 are controlled based on the video signal to be caused to emit the lights, respectively, when necessary, thereby displaying the parallax image corresponding to the video signal thus supplied on the display portion 22.

After the parallax image is displayed, the display controlling portion 21 causes to the processing to proceed to Step S3.

On the other hand, when judging in Step S1 that the video signal about the parallax image is not supplied from the outside, the display controlling portion 21 omits the processing in Step S2, and causes the processing to proceed to Step S3.

In Step S3, the display controlling portion 22 judges whether or not the image displaying processing should be completed. When judging that the image displaying processing should not be completed, the display controlling portion 22 returns the processing back to Step S1, and executes the processing in and after the processing in Step S1. On the other hand, when judging that the image displaying processing should be completed because, for example, the supply of the video signal is stopped for a while, the display controlling portion 22 completes the image displaying processing.

By carrying out the control in the manner as described above, the display controlling portion 21 can cause the display portion 22 to display thereon the parallax image.

Note that, when the display controlling portion 21 judges in Step S1 whether or not "a video signal about the parallax image" is supplied as the supplied video signal, and as a result of the judgment, shows that the video signal, other than the video signal about the parallax image, containing therein the normal video signal about the two-dimensional image is supplied, the display controlling portion 21 may omit the processing in Step S2, or may cause the processing to proceed to Step S2 even when it is shown that the supplied video signal is a signal about any image as a result of simply judging whether or not the video signal is supplied. In a word, the display controlling portion 21 may enable the parallax image displaying portion 11 to display thereon only the parallax image, or may enable the parallax image displaying portion 11 to display thereon the normal plane image as well other than the parallax image.

Figure 23:
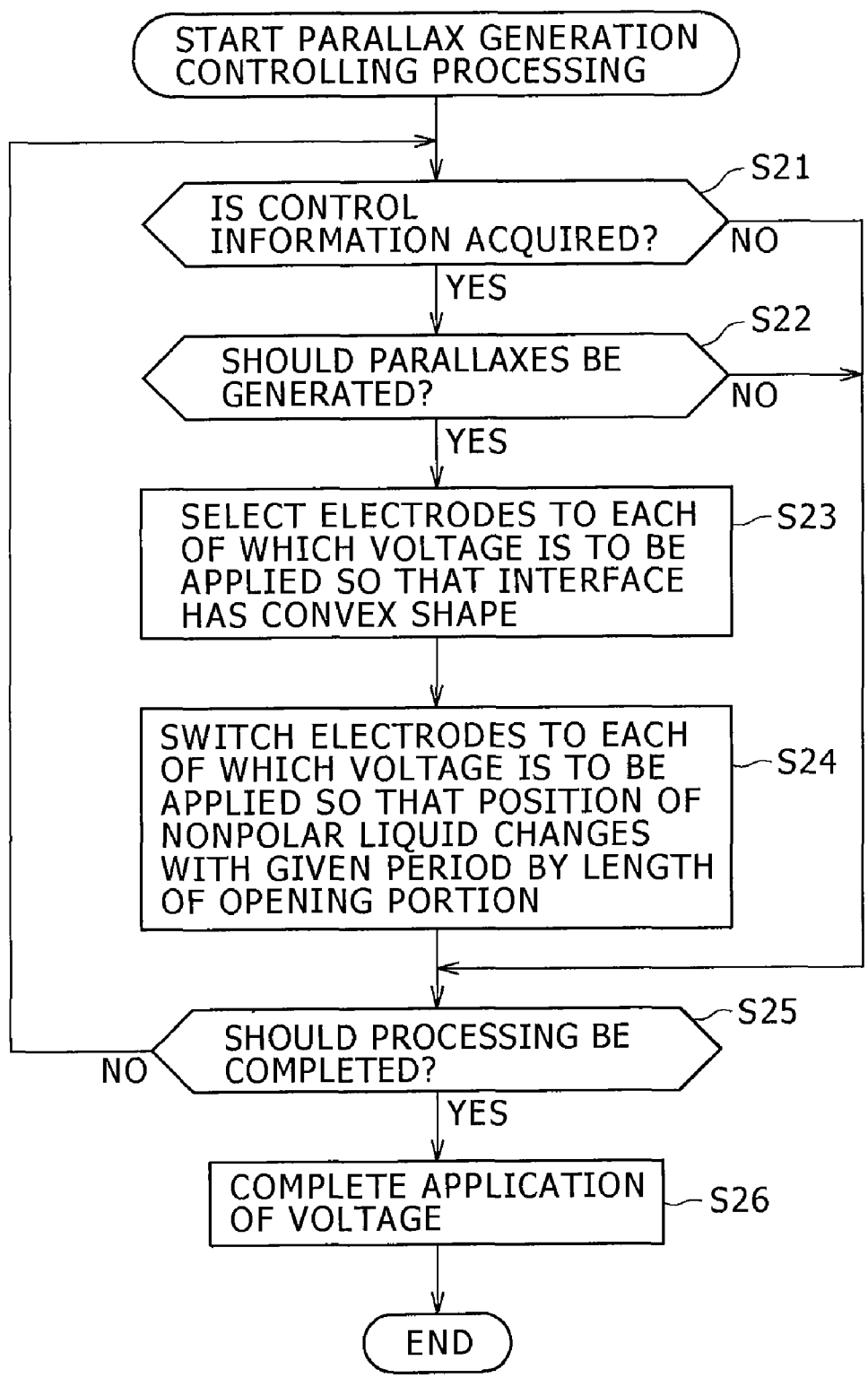
FIG. 23 is a flow chart explaining an example of a flow of parallax generation controlling processing.

Next, an example of a flow of the parallax generation controlling processing executed by the control portion 51 of the parallax generating portion 12 will now be described with reference to a flow chart of FIG. 23.

When the image displaying processing is started by, for example, activating the parallax image displaying device 1 of FIG. 1, in Step S21, the judging portion 53 of the control portion 51 in the parallax generating portion 12 judges whether or not control information is acquired from the outside. When judging that the control information is acquired from the outside, the judging portion 53 causes the processing to proceed to Step S22. Also, the judging portion 53 further judges whether or not the parallaxes should be generated based on the control information.

When judging that the parallaxes of the parallax image displayed on the parallax image displaying portion 11 should be generated, the judging portion 53 causes the processing to proceed to Step S23. In Step S23, the connection selecting portion 72 is controlled by the shape controlling portion 54 to select corresponding ones of the lower electrodes 61 to each of which the voltage is to be applied so that the interface of the nonpolar liquid 63 with the polar liquid 64 has a convex shape (lens-like shape), and the shape controlling portion 54 applies the voltage across each of the lower electrodes 61 thus selected, and the upper electrode 65. After application of the voltage thereacross, the shape controlling portion 54 causes the processing to proceed to Step S24.

In Step S24, the connection selecting portion 72 is controlled by the position controlling portion 55 to switch the corresponding ones of the lower electrodes 61 across the upper electrode 65 and each of which the voltage is to be applied so that the position of the nonpolar liquid 63 changes by a length of the opening portion with a predetermined period. After completion of the processing in Step S24, the position controlling portion 55 causes the processing to proceed to Step S25.

On the other hand, when judging in Step S21 that no control information is acquired from the outside, the judging portion 53 causes the processing to proceed to Step S25. Moreover, when judging in Step S22 that the parallaxes should not be generated, the judging portion 53 causes the processing to proceed to Step S25.

In Step S25, the judging portion 53 judges whether or not the parallax generation controlling processing should be completed. When judging that the parallax generation controlling processing should not be completed, the judging portion 53 returns the processing back to Step S21, and causes the processing in and after the processing in Step S21 to be repeatedly executed. On the other hand, when judging in Step S25 that the parallax generation controlling processing should be completed, the judging portion 53 causes the processing to proceed to Step S26. In Step S26, the connection controlling portion 72 is controlled by the shape controlling portion 54 and the position controlling portion 55 to release all the lower electrodes 61 from the connection to the upper electrode 65. As a result, the shape controlling portion 54 and the position controlling portion 55 completes the application of the voltage across each of the corresponding ones of the lower electrodes 61, and the upper electrode 65. After completion of the voltage thereacross, the shape controlling portion 54 and the position controlling portion 55 complete the parallax generation controlling processing.

By controlling the generation of the parallaxes in the manner as described above, the control portion 51 of the parallax generating portion 12 can generate the parallaxes of the parallax image displayed on the display portion 22 of the parallax portion 22 of the parallax image displaying portion 11 based on the control information. At this time, as described above, the position of the nonpolar liquid 63 is switched while the emission directions of the lights are suitably controlled. As a result, the control portion 51 can control each of the liquid lens portions 56 of the optical path controlling portion 52 so that more parallaxes can be generated without reducing the resolution and the image quality.

As described above, the parallax image display device 1 can display the parallax image while generating the parallaxes. As a result, the parallax image display device 1, for example, displays an advertisement of a commercial product A for a user who lies ahead of the display surface of the parallax image on the right, and displays an advertisement of a commercial product B for a user who lies ahead of the display surface of the parallax image on the left. Thus, the parallax image display device 1 can display the images different from each other for users who lie in places different from each other.

It is noted that although both the parallax image displaying portion II and the parallax generating portion 12 have been so far as a part of the construction of the parallax image display device 1, the present invention is not limited thereto. That is to say, the parallax image displaying portion 11 and the parallax generating portion 12 may be constructed in the form of independent devices (for example, a parallax image display device and a parallax generating device), respectively. In this case, for example, the parallax image display device and the parallax generating device operate in cooperation with each other, and totally carry out the same operation as that of the parallax image display device 1 of FIG. 1.

In addition, although the description has been given so far with respect to the parallax image display device 1 which generates transversely the parallaxes, the direction of generation of the parallaxes may be any direction. For example, the direction of generation of the parallaxes may be either a longitudinal direction and an oblique direction.

Figure 24:
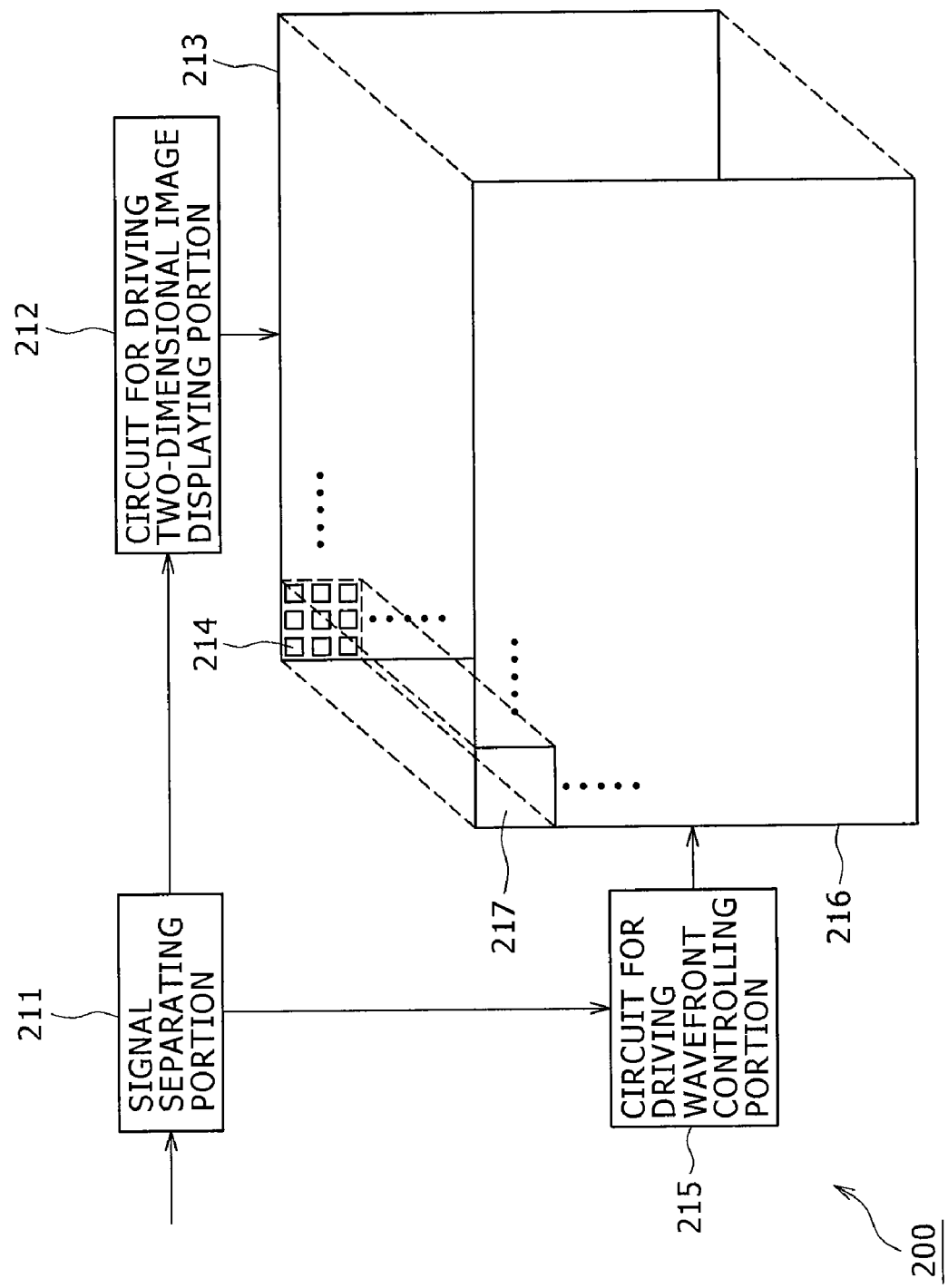
FIG. 24 is a view showing a constructional example of a wavefront control type display device to which the present invention is applied.

In addition, an image can be sterically displayed by utilizing the IP method utilizing the parallaxes. FIG. 24 is a view showing a constructional example of a wavefront control type display device to which an embodiment is applied.

Referring to FIG. 24, the wavefront control type display device 200 is a device which realizes stereo display (three-dimensional display), that is, which displays two-dimensionally a parallax image containing therein parallax information, and generates parallaxes of the parallax image, thereby causing a two-dimensional image to look like a stereo image. The wavefront control type display device 200 has a signal separating portion 211. When acquiring a signal, supplied from the outside, about a parallax image containing therein both parallax information and image information, the signal separating portion 211 separates this signal into a signal (video signal) containing therein the image information, and a signal (parallax information signal) containing therein the parallax information. The wavefront control type display device 200 further has a circuit 212 for driving a two-dimensional image displaying portion, and a two-dimensional image displaying portion 213. The signal separating portion 211 supplies the video signal obtained through the signal separation to the circuit 212 for driving a two-dimensional image displaying portion.

The circuit 212 for driving a two-dimensional image displaying portion has a circuit structure for driving the two-dimensional image displaying portion 213, and supplies the video signal to the two-dimensional image displaying portion 213 in accordance with a clock signal, and a synchronous signal when necessary, and a luminance signal, a color-expression signal, and the like, thereby driving the two-dimensional image displaying portion 213. The two-dimensional image displaying portion 213 has a plurality of luminescent pixels 214 developed in a plane form. Each of the luminescent pixels 214, for example, has a structure of a semiconductor light emitting element. It is noted that the two-dimensional image displaying portion 213 not only may be the display device having a group of luminescent pixels 214, but also may be any of other displays, for example, a liquid crystal display device, an organic electro luminescence display device, a field emission display device, a plasma display panel, an electro chromic display device, a display device using a fluorescent display tube, a display device using a cathode ray tube, a projector or the like. The two-dimensional image displaying portion 213 is not especially limited as long as it is a display device in which a wavefront can be controlled by a wavefront controlling portion 216 as will be described later.

The luminescent pixels 214 are structured by combining single-color emitting elements or elements each of which can emit a light in full color with one other.

In addition, the wavefront control type display device 200 further has a circuit 215 for driving a wavefront controlling portion, and a wavefront controlling portion 216. The signal separating portion 211 supplies the parallax information signal obtained through the signal separation to the circuit 215 for driving a wavefront controlling portion.

The circuit 215 for driving a wavefront controlling portion has a circuit structure for driving the wavefront controlling portion 216. The wavefront controlling portion 216 has a plurality of liquid lens portions 217 which are disposed in matrix so as to face the image display surface of the two-dimensional image displaying portion 213. Since the details of the structure of the liquid lens portion 217 are the same as those of the structure of the liquid lens portion 56 described with reference to FIG. 5, the description thereof is omitted here. In addition, as shown in FIG. 24, one liquid lens portion 217 is disposed so that the liquid lens portion 217 corresponds to a plurality of luminescent pixels 214 (nine luminescent pixels in the case of FIG. 24), and each of emitted lights from these luminescent pixels 214 passes through the liquid lens portion 217. The wavefront controlling portion 216 is controlled by the circuit 215 for driving a wavefront controlling portion to drive each of the liquid lens portions 217. Also, the wavefront controlling portion 216 wavefront-controls a display wavefront of the parallax image displayed two-dimensionally on the two-dimensional image displaying portion 213, which results in that the wavefront control type display device 200 generates the parallaxes.

By adopting such a construction, the wavefront control type display device 200 wavefront-controls a display wavefront from the two-dimensional image displaying portion 213 to generate the parallaxes, thereby making it possible to sterically display the image. At this time, since die liquid lens portion 217 of the wavefront controlling portion 216 has the same structure as that in the case of FIG. 5, the wavefront control type display device 200 can generate more parallaxes without reducing the resolution and the image quality, and can perform the natural stereo display (having the higher degree of appearance of solidity) in which a change in image due to the position is more smooth.

A series of processing described above can be executed either by hardware or by software. When the series of processing is executed by the software, a program constituting the software is installed in a computer incorporated in dedicated hardware, or, for example, is installed from a program recording medium in a general-purpose personal computer or the like which can carry out various functions by installing therein various programs.

FIG. 25 is a block diagram showing an example of a configuration of a personal computer which executes the series of processing described above in accordance with a program. In FIG. 25, a central processing unit (CPU) 301 of a personal computer 300 executes various processing in accordance with a program stored either in a read only memory (ROM) 302, or in a memory portion 313. A program which the CPU 301 executes, or data is suitably stored in a random access memory (RAM) 303. The CPU 301, the ROM 302, and the RAM 303 are connected to one another through a bus 304.

An I/O interface 310 is connected to the CPU 301 through the bus 304. An input 311 constituted by a keyboard, a mouse, a microphone or the like, and an output portion 312 constituted by a display, a speaker or the like is connected to the I/O interface 310. The CPU 301 executes various processing in accordance with a command inputted through the input portion 311. Also, the CPU 301 outputs the processing results to the output portion 312.

The memory portion 313 connected to the I/O interface 310, for example, is constituted by a hard disc, and stores therein a program which the CPU 301 executes, or various data. A communication portion 314 communicates with an external apparatus through a network such as the Internet or a local area network.

In addition, a program may be acquired through the communication portion 314 and may be stored in the memory portion 313.

When being loaded with a removal media 321 such as a magnetic disc, an optical disc, a magnet-optical disc, or a semiconductor memory, a drive 315 connected to the I/O interface 310 drives such a removal media 321, and acquires a program or data recorded in the removal media 321. The program or data thus acquired is transferred to the memory portion 313 when necessary, and is stored in the memory portion 313.

A program recording medium for storing therein a program which is installed in a computer and is caused to be an executable state by the computer, as shown in FIG. 25, is composed of the removal media 321 as a package media constituted by a magnetic disc (including a flexible disc), an optical disc (including a compact disc-read only memory (CD-ROM), and a digital versatile disc (DVD)), a magneto-optical disc, a semiconductor memory or the like, or the ROM 302 in which the program is temporarily or permanently stored, a hard disc constituting the memory portion 313, and the like. The storage of the program in the program recording medium is carried out by utilizing a wired or wireless communication media such as a local area network, the Internet, or a digital satellite broadcasting through the communication portion 314 as an interface such as a router or a modem when necessary.

It is noted that in this specification, the step of describing the program to be stored in the program recording medium includes the processing which is executed in parallel or individually even if not being necessarily processed in a time series manner as well as the processing which is executed in a time series manner along the order described.

In addition, in this specification, the system means the entire system composed of a plurality of apparatuses.

It is noted that the embodiment of the present invention is not limited to the embodiment described above, and the various changes may be made without departing from the spirit and scope of the present invention.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A display controlling method comprising:
two-dimensionally displaying a parallax image as an image containing therein information on parallaxes with which a viewed image differs depending on a viewing position by causing a plurality of luminescent pixels two-dimensionally disposed to emit lights, respectively, while the emitted lights from said respective luminescent pixels are separated from one another at predetermined intervals; and
changing a position of a nonpolar liquid of each of a plurality of liquid lenses disposed two-dimensionally for controlling optical paths of the emitted lights from said respective luminescent pixels based on a shape of an interface between a polar liquid having a polarity and a nonpolar liquid having no polarity in correspondence to the predetermined intervals, a refractive index of said polar liquid being different from that of said nonpolar liquid, so that each of said liquid lenses emits the plurality of emitted lights in a plurality of directions different from one another, respectively, thereby generating the parallaxes,
wherein each of the liquid lenses includes a plurality of first electrodes and a second electrode, and changing the position of the nonpolar liquid of each of the plurality of liquid lenses includes selecting one of the plurality of first electrodes to which a voltage is applied, thereby changing the direction of emitted light, said nonpolar liquid having a shape, wherein after said change of the position of the nonpolar liquid occurs, said shape remains substantially the same.

2. A computer program product stored on a non-transient computer-readable medium including executable instructions that when executed by at least one processor performs steps comprising:
two-dimensionally displaying a parallax image as an image containing therein information on parallaxes with which a viewed image differs depending on a viewing position by causing a plurality of luminescent pixels two-dimensionally disposed to emit lights, respectively, while the emitted lights from said respective luminescent pixels are separated from one another at predetermined intervals; and
changing a position of a nonpolar liquid of each of a plurality of liquid lenses disposed two-dimensionally for controlling optical paths of the emitted lights from said respective luminescent pixels based on a shape of an interface between a polar liquid having a polarity and a nonpolar liquid having no polarity in correspondence to the predetermined intervals, a refractive index of said polar liquid being different from that of said nonpolar liquid, so that each of said liquid lenses emits the plurality of emitted lights in a plurality of directions different from one another, respectively, thereby generating the parallaxes,
wherein each of the liquid lenses includes a plurality of first electrodes and a second electrode, and changing the position of the nonpolar liquid of each of the plurality of liquid lenses includes selecting one of the plurality of first electrodes to which a voltage is applied, thereby changing the direction of emitted light, said nonpolar liquid having a shape, wherein after said change of the position of the nonpolar liquid occurs, said shape remains substantially the same.

3. A display device comprising:
parallax image displaying section having a plurality of luminescent pixels disposed two-dimensionally, said parallax image displaying section serving to display two-dimensionally a parallax image as an image containing therein information on parallaxes with which a viewed image differs depending on a viewing position by causing said plurality of luminescent pixels to emit lights, respectively; and
a parallax generating section configured to generate parallaxes of the parallax image displayed by said parallax image displaying section;
wherein said parallax image displaying section is disposed so that lights emitted from said respective luminescent pixels are separated from one another at predetermined intervals on a display surface of the parallax image, and
said parallax generating section includes:
an optical path controlling section composed of a plurality of liquid lenses disposed two-dimensionally, said optical path controlling section serving to control optical paths of the lights emitted from said plurality of different luminescent pixels of said parallax image displaying section based on a shape of an interface between a polar liquid having a polarity and a nonpolar liquid having no polarity, a refractive index of said polar liquid being different from that of said nonpolar liquid; and
a position controlling section for controlling a position of said nonpolar liquid of each of said liquid lenses of said optical path controlling section by utilizing the intervals, so that each of said liquid lenses emits the plurality of emitted lights passing through the corresponding one of said liquid lenses in a plurality of directions different from one another, thereby generating the parallaxes, wherein each of the liquid lenses includes a plurality of first electrodes and include a second electrode, the first electrodes enabling the nonpolar liquid of each of the plurality of liquid lenses to be moved to a plurality of different positions based on voltages applied to one or more of the first electrodes, said nonpolar liquid having a shape, wherein after a change of the position of the nonpolar liquid occurs, said shape remains substantially the same.

4. The display device according to claim 3, wherein said luminescent pixels of said parallax image displaying section are two-dimensionally disposed at predetermined intervals so that the respective emitted lights are separated from one another at predetermined intervals on the display surface of the parallax image.

5. The display device according to claim 4, wherein partitioning section for partitioning the emitted lights on the display surface of the parallax image is further provided between each two luminescent pixels of said parallax image displaying section.

6. The display device according to claim 3, wherein said parallax image displaying section further includes a light shielding section for shielding a part of each of the emitted lights so that the emitted lights from said respective luminescent pixels are separated from one another at predetermined intervals on the display surface of the parallax image.

7. The display device according to claim 6, wherein said light shielding section is a black matrix constituted by a net-like black member for light-shielding a wiring portion and a transistor portion of each of said luminescent pixels.

8. The display device according to claim 6, wherein said light shielding section is a light shielding member having a plurality of pin holes for causing only vicinities of centers of the emitted lights from the different luminescent pixel to pass therethrough.

9. The display device according to claim 6, wherein said light shielding section is a diaphragm mechanism for controlling a light quantity of each of the emitted lights from said respective luminescent pixels.

10. The display device according to claim 3, wherein said parallax image displaying section causes an aperture ratio as a ratio of an area of a portion through which the emitted light is emitted to an area of an entire portion corresponding to one of said liquid lenses on the display surface of the parallax image to be an inverse number of the number, N, of luminescent pixels corresponding to the one of said liquid lens.

11. The display device according to claim 10, wherein for said parallax generating section, said liquid lens is provided in a position which is at a distance of a focal length of said liquid lens from the display surface of the parallax image of said parallax image displaying section; and said position controlling section changes the position of said nonpolar liquid by a length of each of portions of said liquid lenses through which the emitted lights are emitted, respectively, by controlling the position of said nonpolar liquid.

12. The display device according to claim 3, wherein said liquid crystal lens of said optical path controlling section comprises:

a liquid portion for forming two layers in a passing direction of the emitted lights from said polar liquid and said nonpolar liquid;

the plurality of first electrodes are disposed on a plane vertical to the passing direction of the emitted lights;

the second electrode is disposed to face said plurality of first electrodes so as to sandwich the two layers of said liquid portion between each of said plurality of first electrodes and said second electrode; and a voltage applying section for applying a voltage across each of said plurality of first electrodes and said second electrode;

wherein said position controlling section controls a position of said nonpolar liquid on the plane by selecting said first electrodes to which said voltage applying section applies the voltage for each of said liquid lenses of said optical path controlling section.

13. The display device according to claim 12, wherein said parallax generating means further comprises a shape controlling section for controlling a shape of the interface between said nonpolar liquid and said polar liquid by selecting said first electrodes to which said voltage applying section applies the voltage for each of said liquid lenses of said optical path controlling section.

\* \* \* \* \*